(12) United States Patent
Marty et al.

(10) Patent No.: US 10,343,015 B2
(45) Date of Patent: Jul. 9, 2019

(54) SYSTEMS AND METHODS FOR TRACKING BASKETBALL PLAYER PERFORMANCE

(71) Applicant: PILLAR VISION, INC., Menlo Park, CA (US)

(72) Inventors: Alan W. Marty, Menlo Park, CA (US); John Carter, Elkmont, AL (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

(21) Appl. No.: 15/684,413

(22) Filed: Aug. 23, 2017

(65) Prior Publication Data

US 2018/0056124 A1 Mar. 1, 2018

Related U.S. Application Data

(60) Provisional application No. 62/378,548, filed on Aug. 23, 2016.

(51) Int. Cl.
*A63B 24/00* (2006.01)
*A63B 43/00* (2006.01)
(Continued)

(52) U.S. Cl.
CPC ........ *A63B 24/0021* (2013.01); *A63B 43/004* (2013.01); *A63B 69/0071* (2013.01); *A63B 71/0622* (2013.01); *A63B 71/0669* (2013.01); *G06K 9/00342* (2013.01); *G06T 7/20* (2013.01); *A63B 2024/0034* (2013.01); *A63B 2024/0056* (2013.01); *A63B 2220/40* (2013.01); *A63B 2220/807* (2013.01); *A63B 2225/54* (2013.01);
(Continued)

(58) Field of Classification Search
CPC .............. A63B 69/0071; A63B 63/083; A63B 2067/005; A63B 2243/0037; G06T 7/20
USPC ......................................................... 434/248
See application file for complete search history.

(56) References Cited

U.S. PATENT DOCUMENTS 5,365,427 A * 11/1994 Soignet .............. A63B 24/0021 340/323 R
5,390,912 A * 2/1995 Silagy ................ A63B 69/0071 473/448
(Continued)

OTHER PUBLICATIONS

Rim Map; Noah Basketball; Jun. 14, 2017; http://www.noahbasketball.com/blog/the-rim-map-noahlytics-data-service.*
(Continued)

*Primary Examiner* — Eddy Saint-Vil
*Assistant Examiner* — William D Ermlick
(74) *Attorney, Agent, or Firm* — Maynard Cooper & Gale, P.C.; Jon E. Holland

(57) ABSTRACT

Systems and methods relating to the tracking of the performance of a person playing basketball are described. The systems and methods can be used to determine and evaluate the shot placement of the basketball at the basketball hoop. The shot placement includes a lateral position and a depth position and is determined from a base point on the basketball hoop. The base point can correspond to the portion of the basketball hoop that is closest to the person's location on the basketball court when taking the shot. A placement map can be provided to the person that provides information on the person's shot placements so that the person can make adjustments to his/her shot placement and increase the probability of making a shot.

22 Claims, 11 Drawing Sheets

(51) Int. Cl.
*A63B 69/00* (2006.01)
*A63B 71/06* (2006.01)
*G06K 9/00* (2006.01)
*G06T 7/20* (2017.01)
*G06K 9/32* (2006.01)
*G09B 19/00* (2006.01)

(52) U.S. Cl.
CPC .......... *A63B 2243/0037* (2013.01); *G06K 2009/3291* (2013.01); *G06T 2207/10016* (2013.01); *G06T 2207/30224* (2013.01); *G06T 2207/30241* (2013.01); *G09B 19/0038* (2013.01)

(56) References Cited

U.S. PATENT DOCUMENTS

| | | | | |
|---|---|---|---|---|
| 5,665,016 | A * | 9/1997 | Burnett | A63B 24/0021 473/448 |
| 6,148,271 | A | 11/2000 | Marinelli | |
| 6,322,455 | B1 * | 11/2001 | Howey | A63B 24/0003 273/461 |
| 6,389,368 | B1 * | 5/2002 | Hampton | A63B 24/0084 473/479 |
| 6,418,179 | B1 * | 7/2002 | Shieh | A63B 63/083 377/5 |
| 6,419,590 | B1 * | 7/2002 | Criger | A63B 63/007 473/174 |
| 7,094,164 | B2 * | 8/2006 | Marty | A63B 24/0021 273/317.3 |
| 7,850,552 | B2 | 12/2010 | Marty et al. | |
| 7,854,669 | B2 | 12/2010 | Marty et al. | |
| 8,398,500 | B1 * | 3/2013 | Bouvier | A63B 71/0669 273/371 |
| 8,408,982 | B2 | 4/2013 | Marty et al. | |
| 8,409,024 | B2 | 4/2013 | Marty et al. | |
| 8,617,008 | B2 | 12/2013 | Marty et al. | |
| 8,622,832 | B2 * | 1/2014 | Marty | A63B 24/0003 463/36 |
| 8,908,922 | B2 | 12/2014 | Marty et al. | |
| 8,948,457 | B2 | 2/2015 | Marty et al. | |
| 8,986,140 | B1 * | 3/2015 | Fuller | A63B 69/0071 473/422 |
| 9,108,097 | B1 * | 8/2015 | Rhone | A63B 69/3676 |
| 9,238,165 | B2 | 1/2016 | Marty et al. | |
| 9,283,431 | B2 | 3/2016 | Marty et al. | |
| 9,283,432 | B2 * | 3/2016 | Marty | A63B 24/0003 |
| 9,345,929 | B2 | 5/2016 | Marty et al. | |
| 9,358,455 | B2 | 6/2016 | Marty et al. | |
| 9,370,704 | B2 | 6/2016 | Marty et al. | |
| 9,390,501 | B2 * | 7/2016 | Marty | A63B 24/0003 |
| 9,694,238 | B2 | 7/2017 | Marty et al. | |
| 9,697,617 | B2 | 7/2017 | Marty et al. | |
| 2004/0204258 | A1 * | 10/2004 | Hanoun | A63B 24/0021 473/154 |
| 2005/0043109 | A1 * | 2/2005 | Buckley | A63B 71/0669 473/150 |
| 2005/0101415 | A1 * | 5/2005 | Sweeney | A63B 24/0021 473/407 |
| 2005/0223799 | A1 * | 10/2005 | Murphy | A61B 5/1124 73/510 |
| 2007/0219025 | A1 * | 9/2007 | Aberton | A63B 24/0003 473/450 |
| 2008/0261726 | A1 * | 10/2008 | Chipperfield | A63B 24/0021 473/434 |
| 2008/0312010 | A1 * | 12/2008 | Marty | A63B 24/0003 473/447 |
| 2009/0111616 | A1 * | 4/2009 | Creelman | A63B 24/0021 473/415 |
| 2011/0013087 | A1 * | 1/2011 | House | A63B 24/0021 348/564 |
| 2011/0143868 | A1 * | 6/2011 | Marty | A63B 69/0071 473/447 |
| 2013/0095959 | A1 * | 4/2013 | Marty | A63B 24/0003 473/431 |
| 2014/0092253 | A1 * | 4/2014 | Marty | A63B 69/0071 348/157 |
| 2014/0195021 | A1 * | 7/2014 | Thurman | A63B 41/02 700/91 |
| 2014/0195022 | A1 * | 7/2014 | Thurman | G09B 19/0038 700/91 |
| 2014/0222177 | A1 * | 8/2014 | Thurman | G09B 19/0038 700/92 |
| 2014/0228155 | A1 * | 8/2014 | Hohteri | G09B 19/0038 473/422 |
| 2014/0296004 | A1 * | 10/2014 | Myles | A63B 63/083 473/485 |
| 2014/0301598 | A1 * | 10/2014 | Marty | G06T 7/2033 382/103 |
| 2014/0371885 | A1 * | 12/2014 | Ianni | G06K 9/00342 700/91 |
| 2015/0057775 | A1 * | 2/2015 | Dong | A61B 5/1113 700/91 |
| 2015/0085131 | A1 * | 3/2015 | Anderson | H04N 7/181 348/157 |
| 2015/0131845 | A1 * | 5/2015 | Forouhar | G06K 9/00724 382/100 |
| 2015/0165294 | A1 * | 6/2015 | Wackerly | A63B 69/0071 473/448 |
| 2015/0332450 | A1 * | 11/2015 | Marty | A63B 24/0003 348/46 |
| 2016/0051880 | A1 * | 2/2016 | Hoffman | A63B 69/0071 473/447 |
| 2016/0121184 | A1 * | 5/2016 | Seaman | A63B 63/083 473/447 |
| 2016/0121193 | A1 | 5/2016 | Marty et al. | |
| 2016/0193518 | A1 * | 7/2016 | Baxter | A63B 69/0071 473/450 |
| 2016/0212385 | A1 | 7/2016 | Ginsberg et al. | |
| 2016/0279498 | A1 * | 9/2016 | Gordon | A63B 69/0071 |
| 2016/0325167 | A1 * | 11/2016 | Constantin | A63B 69/0071 |
| 2017/0072283 | A1 * | 3/2017 | Davisson | A61B 5/6895 |
| 2017/0098125 | A1 | 4/2017 | Marty et al. | |
| 2017/0144030 | A1 * | 5/2017 | King | A63B 63/08 |
| 2017/0161561 | A1 * | 6/2017 | Marty | G06K 9/00724 |
| 2017/0193140 | A1 * | 7/2017 | Brothers | G06F 17/5009 |

OTHER PUBLICATIONS

Final Written Decision, USPTO PTAB Case No. IPR2014-00764, U.S. Pat. No. 8,622,832 B2, Nov. 12, 2015.
Marty, U.S. Appl. No. 15/173,245, entitled, "Systems and Methods for Tracking Dribbling in Sporting Environments," filed Jul. 3, 2016.
Marty, U.S. Appl. No. 15/346,509, entitled, "Systems and Methods for Monitoring Basketballs Along Flight Paths," filed Nov. 8, 2016.
Marty, U.S. Appl. No. 15/366,606, entitled, "Systems and Methods for Monitoring Basketball Shots," filed Dec. 1, 2016.
Marty, U.S. Appl. No. 15/608,490, entitled, "Trajectory Detection and Feedback Systems for Tennis," filed May 30, 2017.
Marty, U.S. Appl. No. 15/624,527, entitled, "True Space Tracking of Axisymmetric Object Flight Using Diameter Measurement," filed Jun. 15, 2017.

* cited by examiner

SYSTEMS AND METHODS FOR TRACKING BASKETBALL PLAYER PERFORMANCE

CROSS REFERENCE TO RELATED APPLICATION

This application claims the benefit of U.S. Provisional Application No. 62/378,548, filed Aug. 23, 2016, and entitled "Systems and Methods for Tracking Basketball Shooting Performance," which application is hereby incorporated by reference in its entirety.

BACKGROUND

Athletes often spend countless hours training in order to improve their skill level so that they can become more competitive in sporting events, such as basketball games. In an effort to assist athletes in improving their skill level, systems have been developed that track an athlete's performance while training or playing a game and then provide feedback indicative of the performance. Such feedback can then be evaluated for helping the athlete to improve his skill level. As an example, commonly-assigned U.S. Pat. No. 7,094,164 describes a system that tracks the trajectory of a basketball during a basketball shot so that the shooter can use feedback from the system for the purpose of improving his/her skill at shooting basketballs.

In addition to improving shot trajectory when shooting a basketball, a shooter may also want to improve the "aiming" of the shot, i.e., the placement of the ball with respect to the basketball hoop. Ideally, the shooter will want to place each shot within a "make zone" of the basketball hoop. The "make zone" of the basketball hoop is a target area within the basketball hoop. A trajectory that results in the center of the basketball passing through the "make zone" results in a made shot, i.e., the ball passes through the hoop. In some cases, the "make zone" may be defined to be a relatively small area within the hoop such that it is possible to make the shot without the center of the ball passing through the "make zone." The shooter may need to make lateral adjustments (e.g., left or right adjustments) and/or depth adjustment (e.g., front or rear adjustments) to his/her shot placement in order to better place the ball within the "make zone" and increase the number of made shots.

Tracking the placement of the ball at the basketball hoop when a shot is taken can present various challenges that may limit the effectiveness of a system that attempts to assess shooting performance. As an example, many basketball shots are often at a non-orthogonal angle to the backboard (and corresponding basketball hoop) as a result of the shooter being located on one side of the court or the other. The taking of shots at different angles often results in a variety of different shot placements with respect to the basketball hoop. Thus, it can be difficult to accurately assess the shooter's overall performance and skill level with respect to shot placement since the same shot placement at the hoop may be within the "make zone" when the shot is taken from one angle (or court location) but may be outside of the "make zone" if taken from another angle (or court location).

BRIEF DESCRIPTION OF THE DRAWINGS

The included drawings are for illustrative purposes and serve only to provide examples of possible structures and process steps for the disclosed inventive systems and methods. These drawings in no way limit any changes in form and detail that may be made to the invention by one skilled in the art without departing from the spirit and scope of the invention.

DETAILED DESCRIPTION

Figure 1:
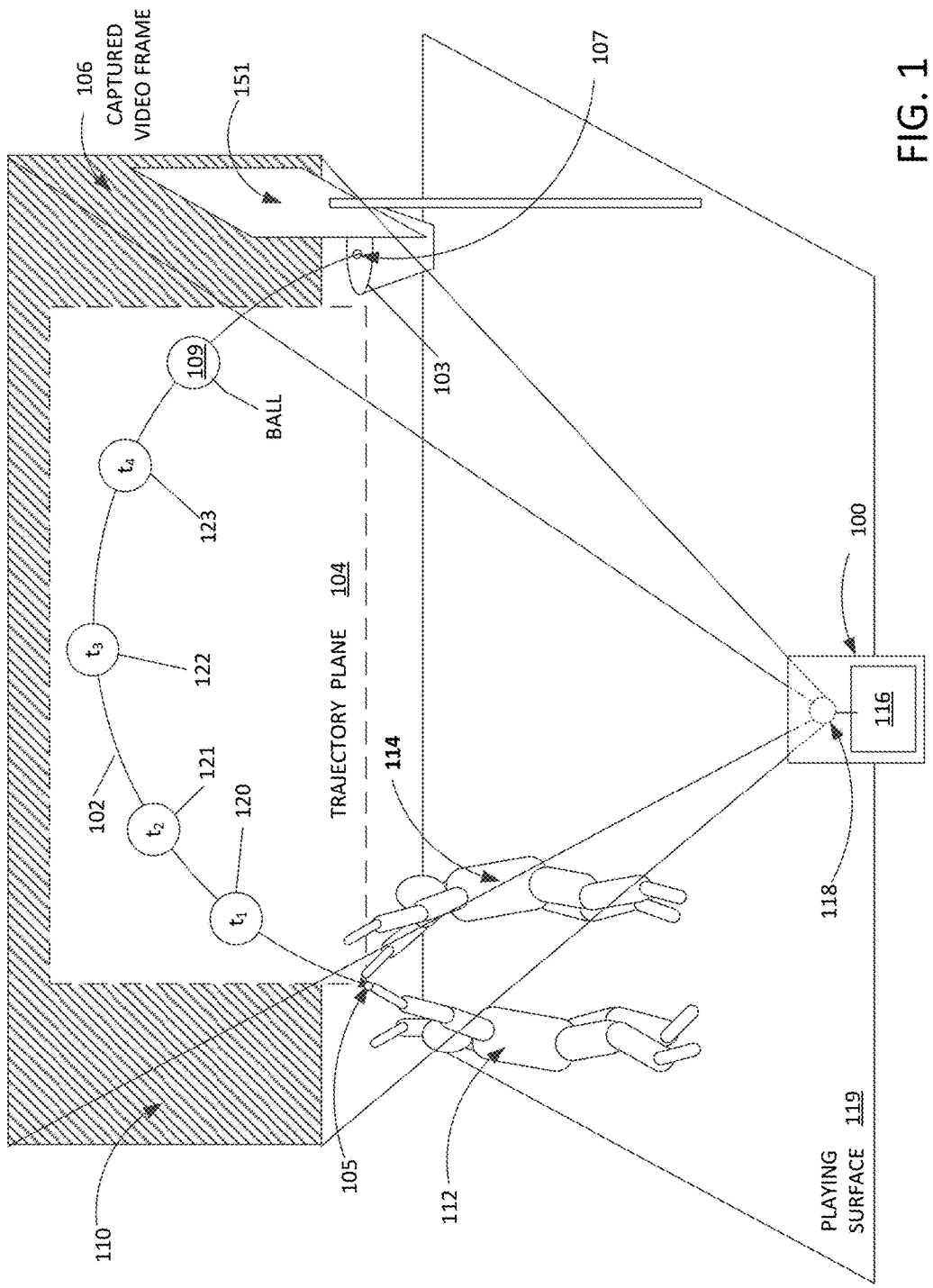
FIG. 1 is a diagram of a trajectory capture scenario performed by a shooting performance system.

Systems and methods are provided for tracking the shooting performance for a person engaged in either a training session for basketball or the playing of a basketball game. In basketball, shooting performance can be based on the trajectory of the shot toward the basketball hoop (shot trajectory) and the placement of the ball with respect to the basketball hoop (shot placement). Depending on the shot trajectory and the shot placement, the shot is either made (i.e., the ball passes through the hoop) or missed (i.e., the ball does not passes through the hoop). The system can use one or more cameras to capture images of the ball from the release of the shot by the person to the ball reaching a termination point at the hoop (which can indicate the end of the trajectory and may indicate the shot placement at the hoop) and at least one processor to analyze the images to determine and evaluate the shot placement and shooting performance. The system can evaluate the shot placement with respect to a "make zone" to determine if the shooter needs to make left or right adjustments or front or back adjustments to the shooter's shot placement in order to increase the probability of making the shot. The system can also identify tendencies in the shooter's shot placement by reviewing multiple shots from the shooter and determining if the shooter is more likely to miss a shot in a particular manner relative to the "make zone", e.g., more shots are to the left of the "make zone" or more shots are short of the "make zone." (i.e., in front of the make zone).

In order to evaluate shot placement and corresponding shooter tendencies for shots from different locations on the basketball court, the system is configured to "normalize" the shot placements from the shooter so that the evaluation of the shot placements can be performed using the same evaluation criteria. The system can normalize each shot placement based on the front of the hoop (or rim) with respect to the shooter's location, i.e., the portion of the hoop that is closest to the shooter when taking a shot. The location of the front of the hoop for the shooter can vary based on the shooter's location on the court. Once the front of the hoop is determined, the evaluation of the shot placement can then occur based on the center line for the hoop that is correlated to the front of the hoop and a "make zone" that is correlated to the front of the hoop. Depending on the location of the front of the hoop, the same shot placement from two different shots may require different adjustments to result in the ball passing through the "make zone". For example, the shot placement for a shot taken from a first position on the court may be to the right of the center line and within the "make zone," but the same shot placement may be to the left of the center line and outside the "make zone" for a second shot taken from a different position on the court. The shot placement can then be normalized by adjusting the shot placement to a new front of the hoop location that corresponds to a common point for all shots. By having all the shot placements normalized to a common point, shooter tendencies with respect to a "make zone" can be identified regardless of the location of the shooter.

One process for evaluating shooting performance can have the system capture the shot with the one or more cameras and then determine the trajectory and shot placement for the shot. The system can then use the trajectory of the shot to determine the location of the shooter on the basketball court. Once the location of the shooter and the origin of the shot are determined, the system can then determine the location of the front of the hoop with respect to the shooter's location. Using the location of the front of the hoop, the system can then evaluate the shot placement with respect to one or more lines correlated with the front of the hoop. The system can then store the shot placement and the location of the shooter and can use the stored information to generate a shot placement map (also referred to as just "placement map" for simplicity) that shows the shooter's tendencies over multiple shots with regard to shot placement. The system can generate a placement map for a particular area of the court or a normalized placement map that covers the entire court.

Systems and methods are also provided for evaluating the shooting skills and capabilities of a shooter based on a set of shooting parameters. The shooting parameters can include average entry angle, average depth position, average lateral (left/right) position, entry angle consistency, depth position consistency, lateral position consistency, and/or other parameters. As described further herein, the entry angle generally refers to the angle (relative to horizontal, e.g., relative to a plane formed by the hoop) that the basketball enters the hoop for multiple shots. Depth position generally refers to the depth (e.g., distance in a horizontal direction parallel to the trajectory of the basketball) from a reference point, such as a center of the hoop, that a center of the basketball passes through the hoop for multiple shots. Lateral position generally refers to the distance in a horizontal direction perpendicular to the trajectory of the basketball from a reference point, such as the center of the hoop, that the center of the basketball passes through the hoop for multiple shots.

In some embodiments, the shooting parameters can be determined using the shot information obtained in generating the placement maps. The shooting capabilities of a shooter can also be evaluated based on a shooting parameter, referred to herein as "release efficiency parameter," which generally refers to a parameter indicating how well the shooter releases the basketball during a shot. The release efficiency parameter can be determined based on parameters such as release height, release speed and release separation that have been normalized to account for different shooters and shot types. The shooting parameters can be used to identify "good" shooters or players who may develop into "good" shooters with additional training.

In some embodiments, the shooting parameters are used to provide various assessments about the shooter's skills and capabilities. As an example, based on the shooting parameters, the system can determine a skill level for the player indicating an assessment of the shooters current shooting skill and ability. Such skill level can be quantitative (e.g., a higher value indicates greater skill) or qualitative (e.g., the shooter could be evaluated to be "bad," "good," or "superior"). As will be described in more detail, the player's skill level may change as he/she trains and is monitored by the system.

A data aggregation system is provided to collect information from multiple systems at multiple locations. The data aggregation system can aggregate the data from the reporting systems and use the aggregated data to identify possible trends or patterns. The data aggregation system can also identify training exercise and programs that have produced "above-average" results in certain areas and that may benefit players and/or teams in improving their performance. The data aggregation system can also be used to provide a portal to third parties such that the third parties can obtain access to and use (e.g., reserve) the systems and corresponding facilities.

FIG. 1 is a diagram of a trajectory capture scenario performed by a shooting performance system. In the embodiment shown in FIG. 1, a shooting performance system 100 uses a machine vision system with one or more cameras 118 (only one camera 118 is shown in FIG. 1 for simplicity) to detect and analyze a trajectory 102 of a basketball 109 shot towards the basketball hoop 103 by the shooter 112. In other embodiments, the shooting performance system 100 can also detect and analyze player movements and the movement of the ball (e.g., passing and dribbling) prior to a shot being taken by a shooter 112. In an embodiment, the cameras 118 may be placed above each basketball hoop 103. As an example, one or more cameras 118 may be mounted above the hoop 103 on a pole or other structure that connects the basketball to a ceiling or wall, or one or more cameras 118 may be placed in the ceiling or rafters of the building, in a scoreboard (including both suspended scoreboards and mounted scoreboards), in a seating area surrounding the basketball court (i.e., playing surface 119) or other locations in the building away from the basketball court that provide a view of the basketball court. Note that it is unnecessary for a camera 118 to be positioned above the hoop 103. As an example, it is possible for a camera 118 to be positioned in a seating area or on a wall where the camera 118 observes play from the side at a height below the hoop 103.

The shooting performance system 100 can detect and analyze the trajectory 102 of a shot with a trajectory detection, analysis and feedback system. An exemplary trajectory detection, analysis and feedback system is described in commonly-assigned U.S. Pat. No. 9,283,432 issued on Mar. 15, 2016 and titled, "TRAJECTORY DETECTION AND FEEDBACK SYSTEM," which is incorporated by reference herein in its entirety and for all purposes.

The basketball hoop 103 may be mounted to a backboard 151 with a support system, such as a pole or other structure anchored into the ground, a support anchored into a wall or supports suspended from a ceiling, to hold the backboard 151 and hoop 103 in a desired location. The basketball hoop 103 may be of a standard height and the basketball may be a standard men's size basketball. However, trajectories for a basketball of a different size, such as a women's ball, shot at basketball hoop of varying heights may also be detected and analyzed with the system 100.

The camera(s) 118 in the machine vision system can record physical information within corresponding detection volumes 110, i.e., the field of view of the camera 118. In one embodiment, the camera(s) 118 can be ultra-high definition (UHD) cameras, also referred to as "4K" cameras, having a resolution between 3840×2160 and 4096×2160 that can do stereoscopic collection or ball size tracking, but other types of cameras are possible in other embodiments. The physical information that is recorded can be images of objects at a particular time in the detection volume 110. The images recorded at a particular time may be stored as a video frame 106. The camera(s) 118 may capture images of the basketball 109 as it moves in a trajectory plane 104, as well as images of other secondary objects, e.g., the players. The secondary objects may be closer to the camera than the basketball 109 (i.e., between the camera 118 and the trajectory plane 104) or the secondary objects may be farther away from the camera than the basketball 109 (i.e., beyond the trajectory plane 104). The machine vision system may utilize software to distinguish between the movement of secondary objects that may be detected and the movement of the basketball 109.

The shooting performance system 100 may be set-up in a playing area where basketball is normally played, such as a basketball court with playing surface 119 located in gymnasium or arena. The system 100 may be positioned on the outside of the court and remotely detect the trajectories of the shots by shooter 112 using the machine vision system. Thus, the shooter 112 and a defender 114 may engage in any of their normal activities on the playing surface 119 without any interference from the detection system 100. As shown in FIG. 1, the shooter 112 is guarded by the defender 114. However, the system 100 may also be used when the shooter 112 is unguarded (e.g., no defender 114 is present).

In one embodiment, the system 100 can use multiple cameras 118 positioned around the playing surface 119 to determine the trajectory 102 of shots taken anywhere on the playing surface 119. The machine vision system can use the video frames 106 from some or all of the cameras 118 in determining the trajectory 102 of a shot. The trajectory plane 104 may be at any angle with respect to the basketball backboard 151 and can range from about 0 degrees for a shot at one corner of the playing surface 119 to about 180 degrees for a shot at the opposite corner of the playing surface 119 (relative to the basketball backboard 151).

To analyze a trajectory 102 of the basketball 109, each camera 118 may record a sequence of video frames 106 in its corresponding detection volume 110 at different times. The number of frames 106 recorded by each camera 118 over a given time period, such as the duration of the ball's trajectory 102, may vary according to the refresh rate of the camera 118. The captured video frames 106 may show a sequence of states of the basketball 109 at different times along its trajectory 102. For instance, the camera 118 may capture some or all of: 1) an initial state 105 of the trajectory 102 shortly after the ball 109 leaves the shooter's hand; 2) a number of states along the trajectory 102, such as 120, 121, 122 and 123 at times t1, t2, t3 and t4; and 3) a termination point 107 in the basketball hoop 103, i.e., the point where the center of the ball 109 passes (or would pass) through the plane of the basketball hoop 103. In one embodiment, the location of the termination point 107 with respect to the basketball hoop 103 can be used to determine a shot placement for the shot.

The sequence of captured video frames may be converted to digital data for analysis by the processing element 116. As described with respect to FIG. 1, the digitized frames capture an image of the ball 109 at times, t1, t2, t3 and t4 as it approaches the basketball hoop 103. The analysis of video frame data may require the detection volume 110 to remain constant during the trajectory 102. However, the detection volume 110 may be adjusted to account for different set-up conditions of a playing area where the system 100 is employed. For instance, the camera(s) 118 may be capable of zooming in or out of a particular area and/or changing focus.

Pattern recognition software may be used to determine the location of the ball 109 from the images that can be captured by camera 118. In one embodiment, a reference frame is captured without a ball and the reference frame is compared with the frames 106 that contain the ball 109. In cases where the reference frame is relatively fixed, i.e., the only moving object is the ball 109. The ball 109 can be identified via subtraction of the frames. The system 100 may capable of updating the reference frame as needed to account for new objects that have moved into the frame or have been removed from the frame. When there is a lot of noise in the frame, such as people or other objects moving around in the frames, as well as the basketball 109, then more complex filtering techniques may be applied. In other embodiments, other techniques for tracking the ball may be used. As an example, the ball may include sensors (e.g., accelerometers, identification devices, such as radio frequency identification (RFID) tags, and other types of sensors) for detecting ball motion and transmit sensor data indicative of such motion to the processing element 116 for analysis.

Once the position of the basketball 109 is determined from each frame. A curve-fit for the trajectory 102 may be developed in a computational space with a coordinate system. The basketball shot by the shooter 112 travels in an essentially parabolic arc in the trajectory plane 104 with gravity 109 being the dominant force acting on the ball. A parabolic curve-fit may be generated using a least squares curve-fit or other curve-fitting algorithm to determine the trajectory 102.

In one embodiment, curve-fits for the x and y position of the ball 109 may be parameterized as a function of time using a time at which each frame was recorded. In another embodiment, a curve-fit of height (y) as a function of distance (x) in the coordinate system may be generated. Using the curve-fit, trajectory parameters, such as an entry angle and the entry velocity of the object as it enters the hoop 103, is near the hoop 103 or at other states along the trajectory 102 may be generated and subsequently used in evaluating shooting performance. For instance, the entry angle may be generated from the tangent of the curve-fit at the termination point 107. The entry velocity may be generated from derivatives of the parameterized equations at the time corresponding to the termination point 107. If the release time is known, then the release velocity and release angle may also be determined from the parameterized trajectory equations.

In one embodiment, trajectory parameters may be generated without curve-fitting the entire trajectory and may only provide data related to a portion of a trajectory 102, such as a beginning, middle or end portion of a trajectory 102. Using a trajectory analysis methodology, other portions of a trajectory 102 that were not captured may be simulated or extrapolated. In particular, after an initial portion of a trajectory 102 is captured, a later aspect of the trajectory 102 may be predicted. For instance, with enough position data near a particular location on the trajectory 102, such as the termination point 107, then an entry angle may be calculated by simply fitting a line through available data points near the termination point 107. As another example, the velocity, direction and angle of the ball 109 as it leaves the shooter's hand may be predicted based upon captured data of the basketball 109 approaching the basketball hoop 103. Thus, the beginning of a trajectory 102 is predicted based on data captured near the end of the trajectory 102. In some embodiments, trajectory parameters may be generated for a portion of a trajectory 102 captured in video frame data and analyzed in a manner described above. The trajectory parameters may be provided as feedback information to a user of the system 100.

The series of frames used to capture the trajectory 102 may also capture the shooter 112 shooting the basketball 109 including all or a portion of the shooter's body as well as the defender's body during the shot. The physical information captured by the cameras 118 regarding the shooter 112 and the defender 114 may also be analyzed by the system 100. For example, different motions of the shooter 112 may be analyzed by the system 100 to determine if the shooter is using proper shooting mechanics. As another example, data, such as, a jump height, hang-time, a release point position on the playing surface 119, and a landing position on the playing surface 119 may be determined using the video frame data captured by the camera(s) 118 in the machine vision system.

Figure 2:
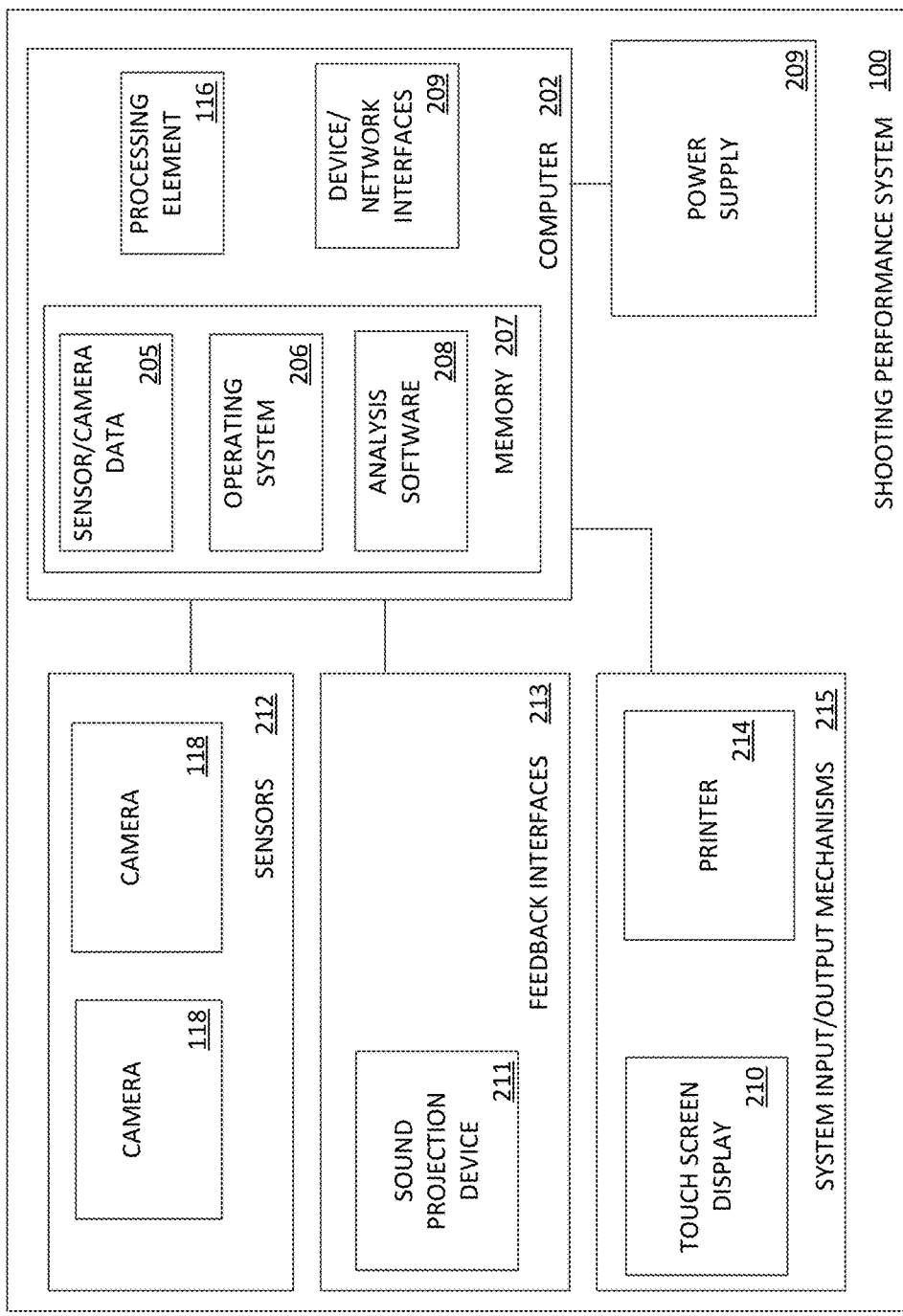
FIG. 2 is a block diagram of an embodiment of a shooting performance system.

FIG. 2 is a block diagram of the shooting performance system 100 for one embodiment. The components of the system 100 may be enclosed within a single housing or may be divided between a plurality of different housings enclosing different components of the system. Further, the system 100 may include different components that are not shown, such as the peripheral devices and remote servers.

Physical information is input into a computer 202 of the system 100 via sensors 212. In one embodiment, a machine vision system may be used where the machine vision system includes one or more cameras 118 (e.g., CCD cameras or CMOS cameras) and a microprocessor for digitizing captured frame data. In another embodiment, the system 100 may employ a plurality of cameras 118 arranged on a mechanism that allows different type cameras 118 to be rotated or moved into place where only one camera 118 is used at a time to record frame data. The different cameras 118 may allow the detection volume 110 of the system 100 to be adjusted. In still other embodiments, the sensors 212 can include sensors, such as audio sensors, accelerometers, motion sensors and/or other types of sensors, that can be used to provide information on events occurring on the playing surface 119. For example, an accelerometer used with ball 109 can provide ball position, movement and/or acceleration information to the computer 202 for use in determining shooting performance. The digitized frame data from the machine vision system (or cameras 118) and/or other sensor data may be stored as sensor/camera data 205 and processed by the computer 202.

The computer 202 may be implemented as one or more general or special-purpose computers, such as a laptop, hand-held (e.g., smartphone), user-wearable (e.g., "smart" glasses, "smart" watch), user-embedded, desktop, or mainframe computer. The computer 202 can include an operating system 206 for generally controlling the operation of the computer 202, including communicating with the other components of the system 100, such as feedback interfaces 213 and the system input/output mechanisms 215. The computer 202 also includes analysis software 208 for analyzing trajectories using the sensor/camera data 205 from sensors 212, determining and analyzing shot placement, determining and analyzing shooting parameters, determining and analyzing release efficiency, determining and analyzing designated offensive and defensive parameters and generating feedback information.

The analysis software 208 may include "computer vision logic," for processing and analyzing the sensor/camera data 205 from the cameras 118. An example of computer vision logic that can be used by the system 100 is described in commonly-assigned U.S. application Ser. No. 15/173,245 filed on Jun. 3, 2016 and titled, "SYSTEMS AND METHODS FOR TRACKING DRIBBLING IN SPORTING ENVIRONMENTS," which is incorporated by reference herein in its entirety and for all purposes. The analysis software 208 can also incorporate other techniques, such as ball tracking, gate tracking, face tracking, body motion tracking, etc., to determine the movement of the players and the ball. The operating system 206 and the analysis software 208 can be implemented in software, hardware, firmware or any combination thereof. In the computer 202 shown in FIG. 2, the operating system 206 and the analysis software 208 are implemented in software and stored in memory 207 of the computer 202. Note that the operating system 206 and the analysis software 208, when implemented in software, can be stored and transported on any non-transitory computer-readable medium for use by or in connection with an instruction execution apparatus that can fetch and execute instructions.

The computer 202 can include at least one conventional processing element 116, which has processing hardware for executing instructions stored in memory 207. As an example, the processing element 116 may include a central processing unit (CPU), a digital signal processor (DSP), a graphic processing unit (GPU) and/or a quantum processing unit (QPU). The processing element 116 communicates to and drives the other elements within the computer 202 via a local interface (not shown), which can include at least one bus.

The computer 202 may also include various network/device communication interfaces 209, such as wireless and wired network interfaces, for connecting to a local area network (LAN), wide-area network (WAN) or the Internet. The device communication interfaces 209 may allow the computer 202 to communicate with a plurality of peripheral devices and other remote system components. The computer 202 can communicate wirelessly, i.e., via electromagnetic or acoustic waves carrying a signal, with the other components of the system 100, but it is possible for the computer 202 to communicate with the other components of the system 1000 over a conductive medium (e.g., a wire), fiber, or otherwise.

Power to the computer 202 and other devices may be provided from the power supply 209. In one embodiment, the power supply 209 may be a re-chargeable battery or a fuel cell. The power supply 209 may include one or more power interfaces for receiving power from an external source, such as an AC outlet, and conditioning the power for use by the various system components. In one embodiment, for indoor/outdoor models, the system 100 may include photocells that are used to provide direct power and charge an internal battery.

Feedback information, used by clients of the system 100 to improve their shooting skills, may be output through one or more feedback interface devices 213, such as a sound projection device 211. In general, the system 100 may be capable of outputting feedback information to a plurality of different devices simultaneously in a plurality of different formats, such as visual formats, auditory formats and kinetic formats.

The system 100 may support a plurality of different input/output mechanisms 215 that are used to input/display operational information for the system 100. The operational information may include calibration and configuration setting inputs for the system 100 and system components. In one embodiment, a touch screen display 210 may be used to input and display operational information using a plurality of menus. Menus may be available for configuring and setting up the system 100, for allowing a player to sign into the system and to select preferred setting for the system 100 and for viewing session information in various formats that have been generated by the system 100. The printer 214 may be used to output hard copies of the session information for a player or other client of the system 100. In other embodiments, a monitor, liquid crystal display (LCD), or other display apparatus, can be used to output data to the user. The system 100 is not limited to a touch screen display 210 as an interface for operational information. Other input mechanisms, such as a keyboard, a mouse, a touch pad, a joystick and a microphone with voice recognition software, may be used to input operation information into the system 100.

The shooting performance system 100 may be incorporated into or be a component of a more comprehensive training and feedback system. An exemplary training and feedback system is described in commonly-assigned U.S. Pat. No. 9,390,501 issued on Jul. 12, 2016 and titled, "STEREOSCOPIC IMAGE CAPTURE WITH PERFORMANCE OUTCOME PREDICTION IN SPORTING ENVIRONMENTS," which is incorporated by reference herein in its entirety and for all purposes.

The shooting performance system 100 can be used to generate a placement map (also referred to as a "heat map") indicating the placement of the shots (with respect to the basketball hoop 103) taken by the shooter 112. The placement map can indicate both a lateral position, i.e., a left-right placement in the hoop 103, and a depth position, i.e., a front-back placement in the hoop 103, for each shot taken by the shooter 112. The placement map can also indicate with an indicator of a first type (e.g., a circle) when the shot was made (i.e., the ball 109 passes through the hoop 103) and indicate with an indicator of a different type (e.g., an "X") when the shot was missed (i.e., the ball 109 did not pass through the hoop 103). The placement map may also indicate areas of the hoop 103 having different shot placement activity (or shot frequency) by the shooter 112. The placement map can show areas where more shots are taken (i.e., areas with more shot placements) and areas of the hoop 103 where fewer (or no) shots are taken (i.e., areas with few to no shot placements).

In one embodiment, the placement map can indicate made shots with a first color and missed shots with a second color. When multiple shots have about the same shot placement, a color selected from a range of colors can be used to indicate how often a shot is made or missed at that shot placement. For example, a made shot can be indicated with green, a missed shot can be indicated with red, and multiple shots can be indicated with a color selected from a range of colors that transitions from green (indicating all shots are made) to yellow (indicating half the shots are made) to red (indicating all shots are missed). Similarly, the placement map can indicate areas with a high shot frequency (i.e., areas of the hoop 103 with many shot placements) with a first color and areas with low shot frequency (i.e., areas of the hoop 103 with few (if any) shot placements) with a second color. When multiple areas have different shot frequencies, a color selected from a range of colors can be used to indicate the frequency of a shot placement occurring in the area. For example, an area where a shot frequently occurs can be indicated with green, an area where a shot infrequently occurs can be indicated with red, and other areas having different shot frequencies can be indicated with a color selected from a range of colors that transitions from green (indicating more shots occur in the area) to yellow (indicating some shots occur in the area) to red (indicating few or no shots occur in the area).

A placement map can be generated for the shooter 112 for any specific location on the playing surface 119. Alternatively, placement maps that correspond to particular areas of the playing surface 119 can be generated for the shooter 112. For example, placement maps can be generated for shots taken from the right or left side of the playing surface 119, shots taken from a center area of the playing surface 119, shots taken close to or far away from the hoop 103, shots taken within a predetermined distance of a specific location on the playing surface 119, shots taken in a predefined area of the playing surface 119 or combinations thereof. In addition, a comprehensive placement map can be generated that normalizes and combines the individual placement maps described above and provides shot placement information based on all of the shots taken by the shooter 112.

Figure 3:
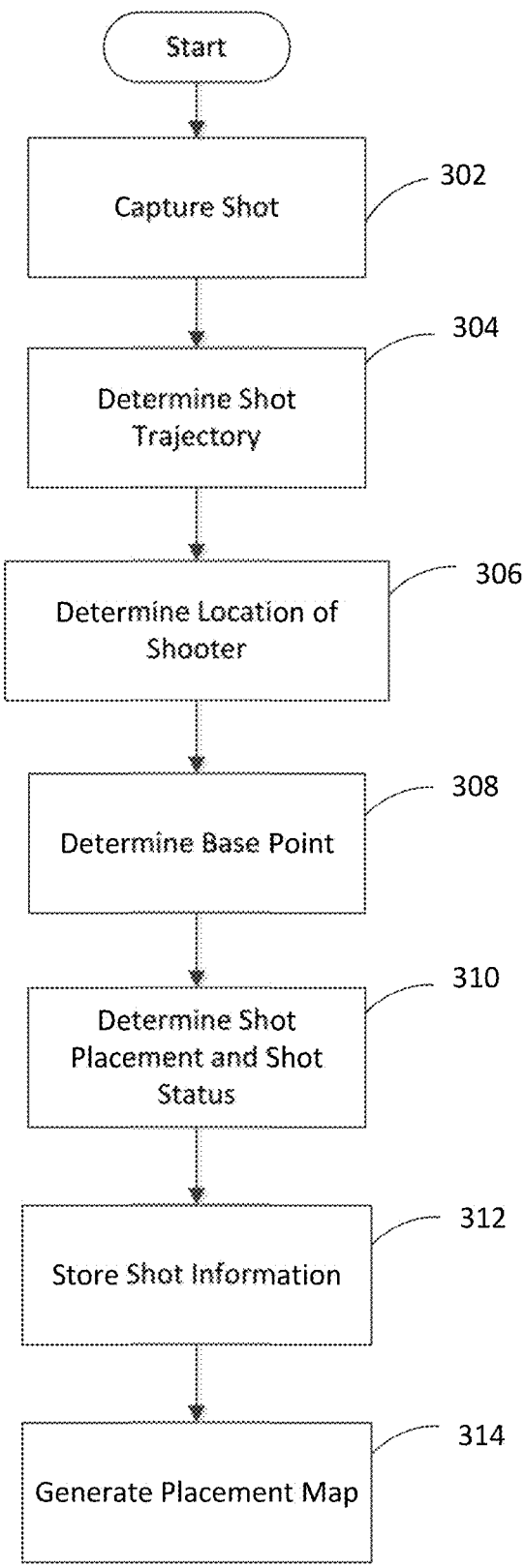
FIG. 3 is a flow chart showing an embodiment of a process for generating a placement map.

FIG. 3 shows an embodiment of a process for generating a placement map for a group of shots taken by a shooter 112. The process begins by capturing a plurality of images of a shot (step 302) with the cameras 118 positioned around the playing surface 119. The cameras 118 can capture the images of the shot as described above. Once the images of the shot have been captured, the shooting performance system 100 can determine the trajectory 102 of the shot (step 304). In one embodiment, the system 100 can determine the trajectory 102 of the shot as described above.

Using the trajectory information, the system 100 can determine the location of the shooter 112 on the playing surface 119 (step 306). In one embodiment, if the system 100 calculated the entire trajectory 102 of the shot, the system 100 can use the trajectory information to determine the location on the playing surface 119 where the shooter 112 took the shot since the entire trajectory 102 includes both the release point 105, which can correspond to the location of the shooter 112, and the termination point 107. In another embodiment, if only a partial trajectory 102 has been calculated, the system 100 can use the partial trajectory 102 information to extrapolate the entire trajectory 102 for the shot and the shooter's location on the playing surface 119. In still other embodiments, the system 100 can determine the location of the shooter 112 on the playing surface 119 by analyzing image data from the cameras 118 that includes the shooter 112 and other sensor data that may be collected. As an example, the location of the shooter within the images captured by the system 100 may be used to determine the shooter's location on the playing surface 119 at the time of shooting the basketball 109. In another example, the shooter 112 may wear one or more sensors (e.g., a radio frequency identification (RFID) tag or a location sensor) that wirelessly communicate with the system 100 to enable the system 100 to determine the shooter's location. For example, the system 100 may use triangulation or other location determination techniques to determine the shooter's location. In some embodiments, sensors (e.g., accelerometers or location sensors) within the basketball 109 may wirelessly communicate with the system 100, which may use data from such sensors to determine the location of the ball 109 at the time of shooting or the trajectory of the ball 109 that can then be used to determine the shooter's location. Various other techniques for determining the shooter's location are possible.

Figure 4:
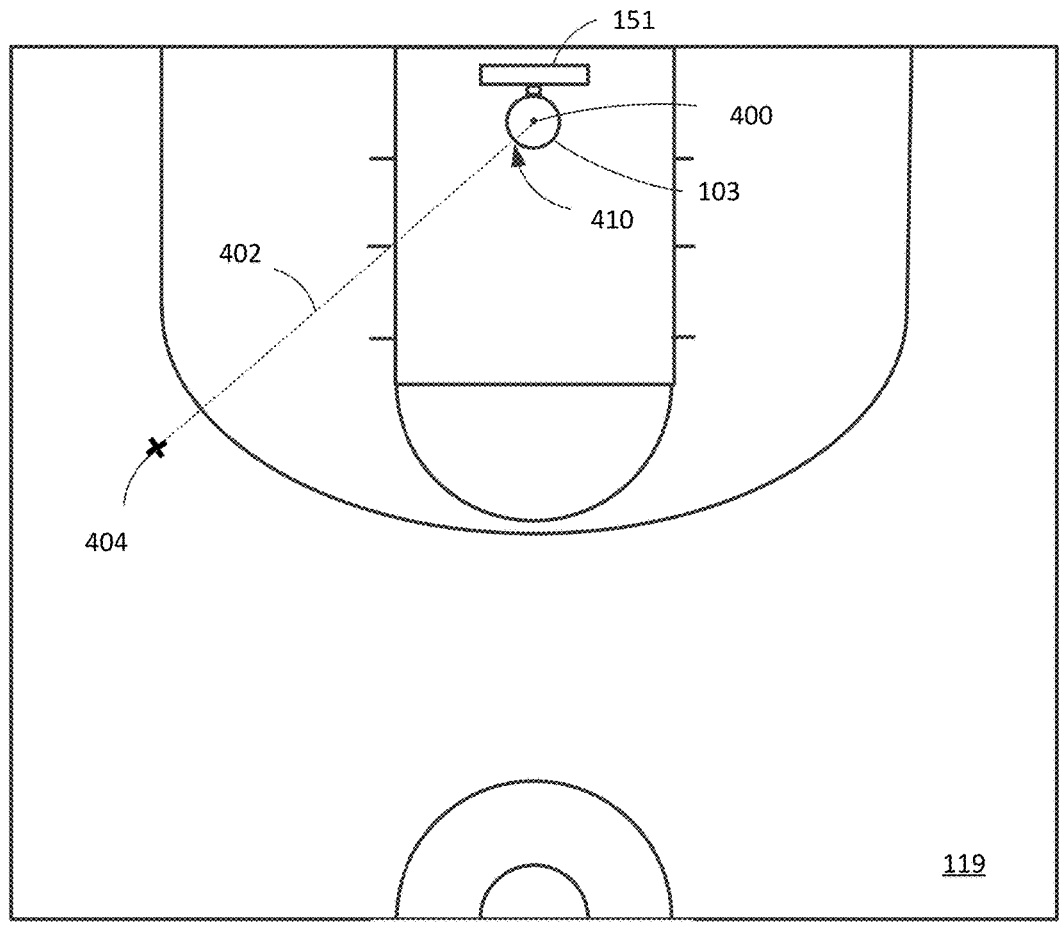
FIG. 4 shows an embodiment of the determination of the base point for a shot.
Figure 5:
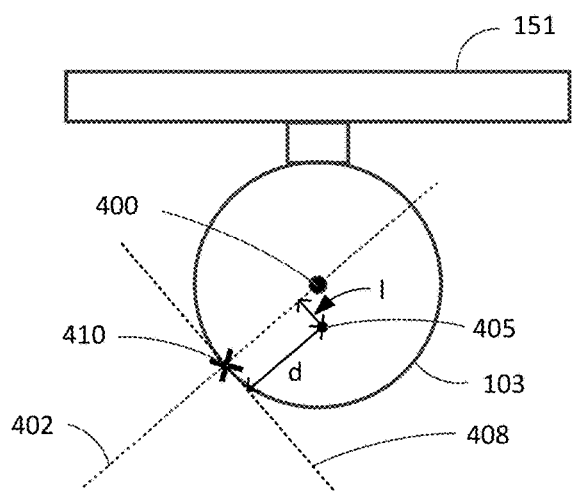
FIG. 5 shows an enlarged view of the basketball hoop from the embodiment of FIG. 4.

After the location of the shooter 112 is determined, the system 100 can then identify a base point with respect to the shooter's location (step 308). In one embodiment, the base point can correspond to the portion of the hoop 103 that is closest to the shooter's location and can be referred to as the "front of the hoop." However, in other embodiments, other locations for the base point can be used (e.g., "rear of the hoop"). FIGS. 4 and 5 show the determination of the base point from the shooter's location. As shown in FIG. 4, the location 404 of the shooter 112 on the playing surface 119 (shown with an "X") can be connected with a line 402 to the center 400 of the hoop 103 (shown with a dot). The portion 410 (shown in FIG. 5 with an "X") of the hoop 103 where the line 402 intersects the hoop 103 can be used as the base point 410. The location of the base point 410 relative to a predefined reference point (e.g., the center of the hoop) indicates the direction of the shooter from the hoop. In other embodiments, other reference points can be selected for the base point 410.

Referring back to FIG. 3, once the base point 410 is determined, the system 100 can determine the shot placement for the shot and the shot status, i.e., whether the shot was made or missed (step 310). The shot placement can correspond to the center of the ball 109 when the ball 109 reaches (or would reach) the plane of the basketball hoop 103. The shot placement can be numerically defined in terms of a lateral position with respect to the base point 410 and a depth position with respect to the base point 410. In other embodiments, other reference points may be used to define the coordinates or other positional data of the shot placement. Note that the coordinates may be relative to any desired coordinate system (e.g., Cartesian or polar).

The lateral position can correspond to a left-right position of the shot with respect to a center line, e.g., line 402 (see FIG. 5), for the basketball hoop 103 that passes through the center 400 of the basketball hoop 103 and a reference point, such as the base point 410. Note that the direction of the line 402 from the center of the hoop indicates the approximate direction, referred to herein as "shot direction," of the shooter's location from the hoop. The depth position can correspond to a front-back position of the shot with respect to a line 408 (see FIG. 5) that passes through the base point 410 of the basketball hoop 104 and is perpendicular to the center line 402 (or is tangent to the basketball hoop 103 at the base point 410). For example, as shown in FIG. 5, an exemplary shot placement shown with a dot 405 can have a lateral position defined by the distance l and a depth position defined by the distance d. A positive l distance can correspond to a shot to the right side of the center line 402 (corresponding to the right side of the shooter 112) and a negative l distance can correspond to a shot to the left side of the center line 402 (corresponding to the left side of the shooter 112). A positive d distance can correspond to a shot "above" line 408, i.e., away from the shooter 112, and a negative d distance can correspond to a shot "below" line 408, i.e., toward the shooter 112. In the embodiment shown in FIG. 5, the lateral position of shot 405 can be +2 inches (corresponding to a shot 2 inches to right of line 402) and the depth position of shot 405 can be +8 inches (corresponding to a shot 8 inches into the basketball hoop 103).

In other embodiments, line 408 can be defined at different locations with respect to the basketball hoop 103, e.g., though the center 400 or at a distance from the base point 410, e.g., approximately 11 inches from the base point 410, corresponding to a desired depth position for the shot. The depth position can be defined in terms of distances above the line 408 (i.e., away from the shooter 112) or below the line 408 (i.e., toward the shooter 112). In one embodiment, the shot placement can correspond to the termination point 107 of the trajectory 102. The system 100 can also determine if the shot was made, i.e., the ball 109 passed through the hoop 103, or missed, i.e., the ball 109 did not pass through the hoop 103, using the trajectory information and the shot placement information. In still another embodiment, the system 100 can determine if the shot was made using the sensor/camera data 205, e.g., looking for the path of the ball 109 relative to the basketball hoop 103.

In one embodiment, a "make zone" can be defined that corresponds to an area of the basketball hoop 103 that can result in a made shot by the shooter 112 if the center of the ball 109 passes through the "make zone." The "make zone" can be defined relative to (e.g., within) a plane defining the top of the basketball hoop 103. The size of the "make zone" can either increase or decrease based on changes in the trajectory 102 or other factors, such as shot velocity. For example, a decrease in the entry angle of the trajectory 102 can result in a smaller "make zone," while a small increase in the entry angle of the trajectory 102 can result in a larger "make zone." However, a large increase in the entry angle of the trajectory 102 may result in a smaller "make zone."

The system 100 can then use the shooter's shot placement information to provide feedback to the shooter 112 on how to increase the shooter's probability of making subsequent shots. For example, if the average lateral position for a shooter is off of a desired point (such as a center of the "make zone") by more than a threshold amount, the feedback can indicate the amount that the shooter 112 should adjust his/her shot to the left or right to bring his/her shots closer to the desired point. Similarly, if the average depth for a shooter is off of a desired point (such as a center of the "make zone") by more than a threshold amount, the feedback can indicate the amount that the shooter 112 should adjust his/her shot to the front or back of the hoop to bring his/her shots closer to the desired point. By training according to the feedback, it is possible for the shooter through muscle memory learn to shoot better shots that have a higher probability of passing through the hoop.

Referring back to FIG. 3, the system 100 can then store information (step 312) on the shot placement, the trajectory 102 of the shot, the base point 410 for the shot, i.e., the "front of the hoop," the location of the shooter 112, whether the shot was made or missed and any other shot information that may be collected by the system 100. Note that the location of the base point indicates the approximate shot direction for the shot. That is, the direction of the shot is approximately along a line from the center of the hoop to the base point. In other embodiments, other types of information may (e.g., angle from a center of the hoop) may be used to indicate shot direction.

After storing information relating to the shot, the system 100 can generate one or more placement maps (step 314) to provide the shooter 112 with information on the shots taken by the shooter 112. FIGS. 6-11 show embodiments of placement maps that can be displayed on display 210 to provide the shooter 112 with information regarding shooting performance.

Figure 6:
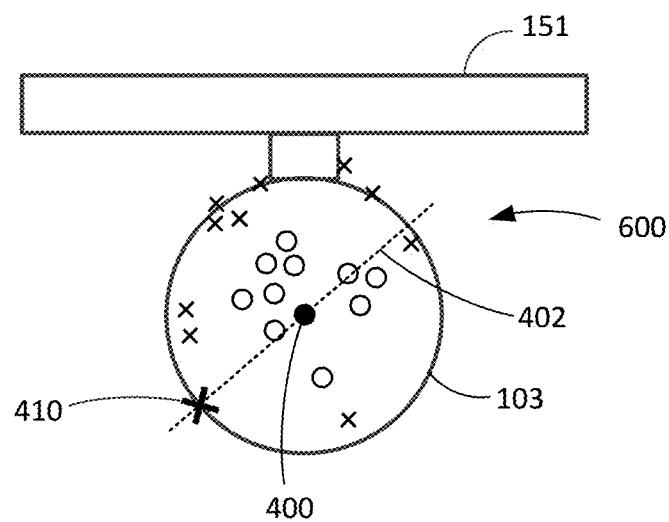
FIGS. 6 and 7 show embodiments of placement maps with the same base point.
Figure 7:
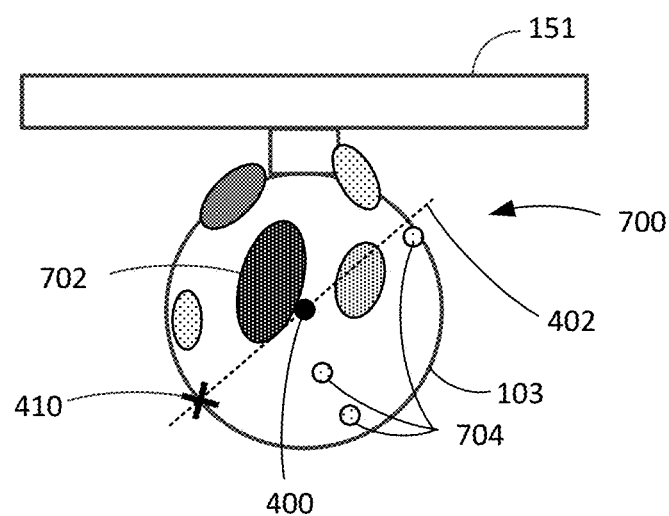

FIGS. 6 and 7 show placement maps for a group of shots taken by the shooter 112 from a specific location 404 on the playing surface 119. FIG. 6 shows a placement map 600 that indicates the shot placements for the group of shots and whether the shot was made (indicated by a circle) or missed (indicated by an "X"). FIG. 7 shows a placement map 700 for the same group of shots used in FIG. 6. However, instead of showing individual shot placements and corresponding shot statuses, FIG. 7 provides information on the frequency with which the shooter 112 has shots in a particular area. As shown in FIG. 7, a first area 702 indicates an area where a shot placement is more likely to occur (e.g., a 30% probability) and second areas 704 that indicate an area where a shot placement is less likely to occur (e.g., a 5% probability) based on the number of shots determined to pass through the respective areas during monitoring. The placement map 700 can also indicate other areas that have a shot frequency somewhere between the frequency of the first area 702 and the frequency of the second area 704. In the embodiment of FIG. 7, the darker the pattern in a corresponding area, the higher the frequency of a shot occurring in that area. The placement maps 600 and 700 can include the location of the base point 410 on the basketball hoop 103, the center 400 of the basketball hoop 103 and the corresponding center line 402 to provide the shooter 112 with information on the angle and location with which the shooter 112 was shooting at the hoop 103. Based on the information in placement maps 600 and 700, the shooter 112 can determine that more of his/her shots are to the left of center line 402 and that more shots are closer to the "back of the hoop" instead of the "front of the hoop."

Figure 8:
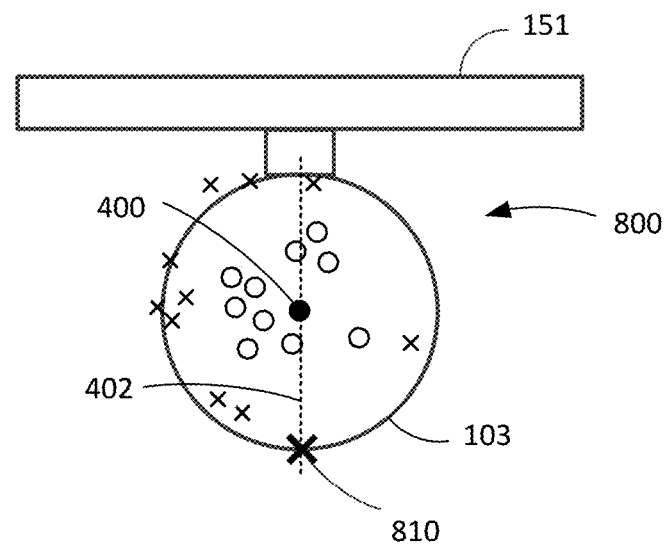
FIGS. 8 and 9 show embodiments of the placement maps of FIGS. 6 and 7 with a normalized base point.
Figure 9:
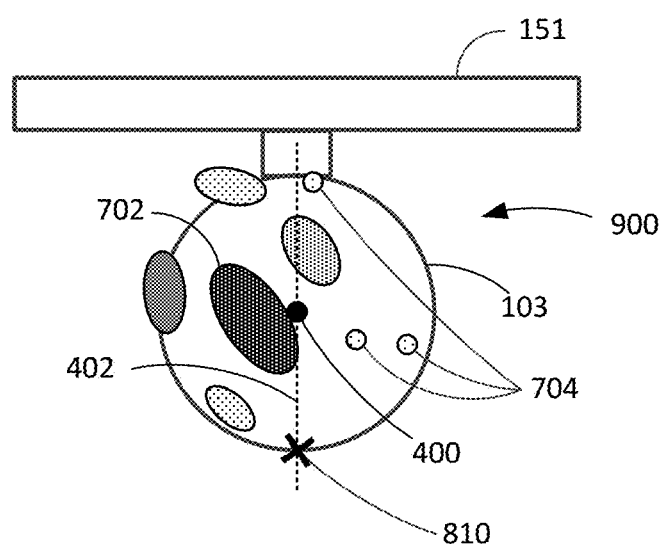

FIGS. 8 and 9 provide the same information from FIGS. 6 and 7 except that the information has been "normalized." FIG. 8 shows a normalized placement map 800 similar to placement map 600 with information and shot location and shot status. FIG. 9 shows a normalized placement map 900 similar to placement map 700 with information on shot frequency areas. To normalize the shot placement information, the shot information in placement maps 600 and 700 (including the lateral position and depth position with respect to the base point 410) can be used with a front point 810 to calculate the "normalized" shot placement. The front point 810 can be a portion of the hoop 103 that is at a location farthest away from the basketball backboard 151. The normalized shot placement for a shot can be determined as the lateral position and the depth position for the shot as measured from the front point 810 instead of the shot's corresponding base point 410. In another embodiment, the shot placement information can be normalized by rotating the base point 410 and each shot placement location about the center 400 of the basketball hoop 103 by an angle A (see FIG. 10, where base point 410-2 corresponds to front point 810) that corresponds to the angle (as measured from the center 400 of the basketball hoop 103) between the shot's corresponding base point 410 and the front point 810. The center line 402 through the front point 810 and the center 400 of the basketball hoop 103 can be perpendicular to the basketball backboard 151.

The normalizing of the shot placement information for shots corresponding to different base points enables the information for multiple shots taken from different shot directions to be displayed on a comprehensive placement map in a manner such that all shot placements are relative to the same shot direction. Without normalization, it may be difficult for a user to visualize whether the shooter tends to shoot in a certain direction (e.g., left, right, front, back) relative to hoop center or other reference point. By adjusting the shot placements such that they are relative to the same shot direction, then shots that drift from the center of the hoop 103 in the same direction will appear to be grouped together on the map (e.g., indicated within the same general vicinity), thereby helping the user to better visualize shooting tendencies. Thus, the normalization can be viewed as adjusting shot placement in order to account for variations in shot direction.

In performing normalization in one embodiment, each shot placement is correlated with data indicative of shot direction (i.e., the direction at which the basketball 109 approaches the hoop 103). For example, as described above, the shot placement (e.g., location within a plane of the hoop 103 through which a center (or other reference point) of the ball 109 passes) may be correlated with a base point that is based on and indicates shot direction. In the normalization process, the shot placement of each shot is updated such that it indicates the location through which the center or other reference point of the ball 109 would have passed had the ball 109 been shot from a predefined reference direction rather than the actual direction indicated by the shot's corresponding base point (assuming that the distance from the hoop 103 and other trajectory parameters remain the same). As an example, the shot placement for a shot taken from a side of the hoop 103 may be adjusted so that it is consistent with the same shot taken from the front of the hoop 103 instead of the side of the hoop 103. If all shot placements of a placement map are normalized to the same reference direction, then tendencies in shot placement can be readily ascertained by viewing the shot placement map.

In other embodiments, the front point 810 can be selected to be any desired reference point on or near the basketball hoop 103. In still another embodiment, the shot direction information can be used to adjust the shot placement information to correspond to a predefined shot direction. In one embodiment, the shot placement information can be normalized by angularly adjusting the shot placement position by an angle corresponding to the difference in angle between the shot direction and the predefined shot direction.

Figure 10:
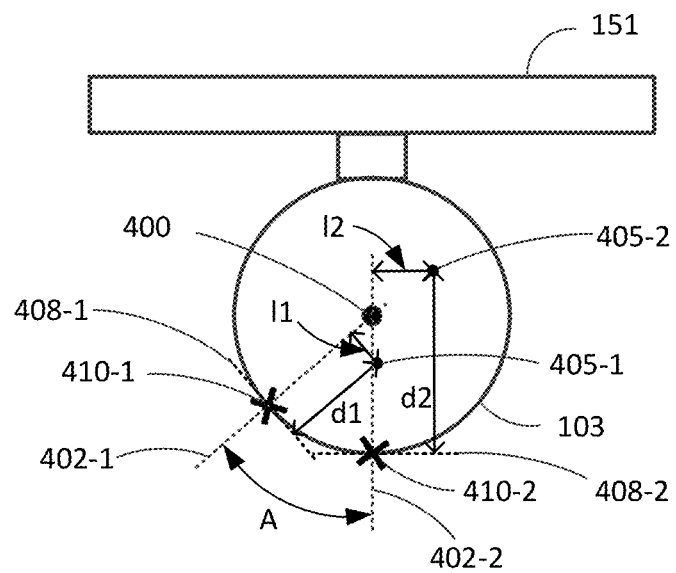
FIG. 10 shows an embodiment of a shot placement map with multiple base points.
Figure 11:
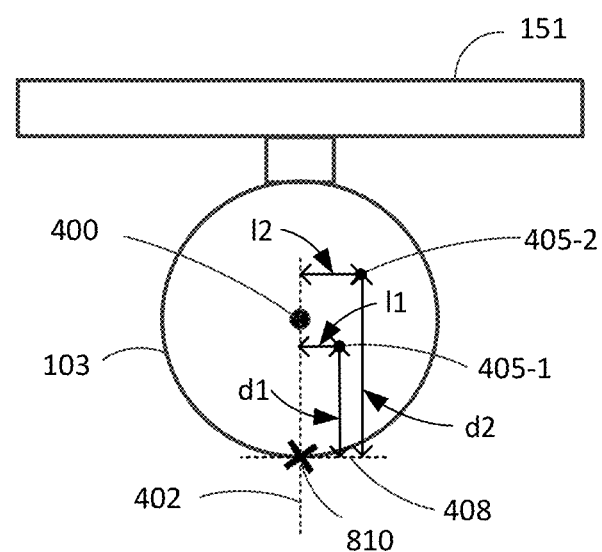
FIG. 11 shows the shot placement map of FIG. 10 with a normalized base point.

As an example of how the normalization of shots may occur, reference is made to FIGS. 10 and 11. FIG. 10 shows an exemplary placement map for two shots. The placement map of FIG. 10 does not provide make/miss information with respect to the shots only the location of the shots. As seen in FIG. 10, a first shot can have a first shot placement identified by dot 405-1. The first shot placement 405-1 can have a corresponding base point 410-1, center line 402-1 and "tangent" line 408-1. Based on the center line 402-1 and tangent line 408-1, the first shot placement 405-1 can be defined according to a lateral position (l1) and a depth position (d1) with respect to the base point 410-1. A second shot can have a second shot placement identified by dot 405-2. The second shot placement 405-2 can have a corresponding base point 410-2, center line 402-2 and "tangent" line 408-2. As can be seen in FIG. 10, base point 410-2 can correspond to the front point 810 (see FIG. 11) and the center line 402-2 can be perpendicular to the backboard 151. Based on the center line 402-2 and tangent line 408-2, the second shot placement 405-2 can be defined according to a lateral position (l2) and a depth position (d2) with respect to the base point 410-2.

As shown in FIG. 11, the first shot placement 405-1 and the second shot placement 405-2 have been normalized to the front point 810. Since the base point 410-2 for the second shot placement 405-2 is at the same location as the front point 810 (i.e., the base point 410-2 and the front point 810 coincide), the location of the second shot placement 405-2 is the same in both FIGS. 10 and 11. However, the base point 410-1 for the first shot placement 405-1 is at a different location from the front point 810 and thus has to be normalized to the front point 810. To normalize the first shot placement 405-1 to the front point 810, a point can be located at the corresponding lateral distance for the first shot placement 405-1 (the lateral distance l1) based on center line 402 for front point 810 and at the corresponding depth distance for the first shot placement 405-1 (the depth distance d1) based on tangent line 408 for front point 810. The location of the point at the lateral position l1 and the depth position d1 with respect to the front point 810 corresponds to the normalized location for the first shot placement 405-1.

Figure 13:
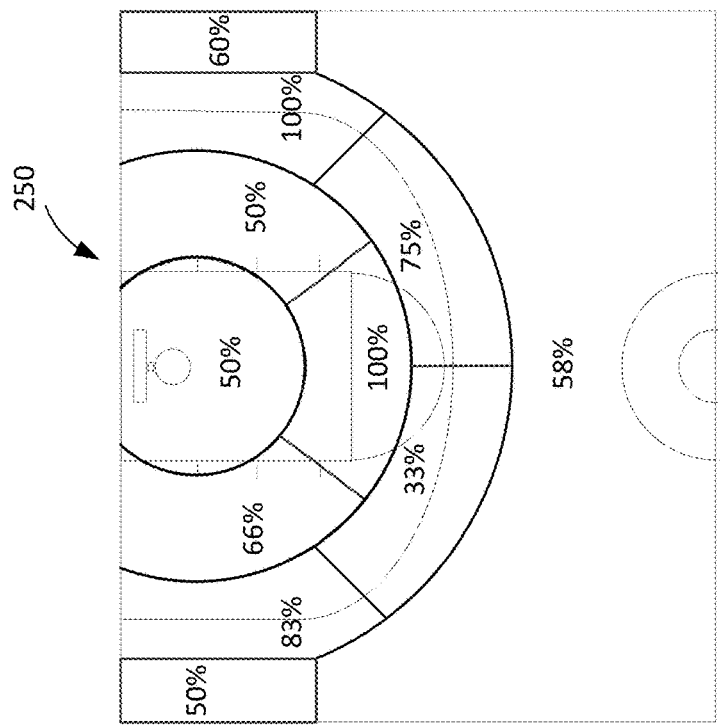
FIGS. 12 and 13 show embodiments of shot location maps for a shooter.
Figure 12:
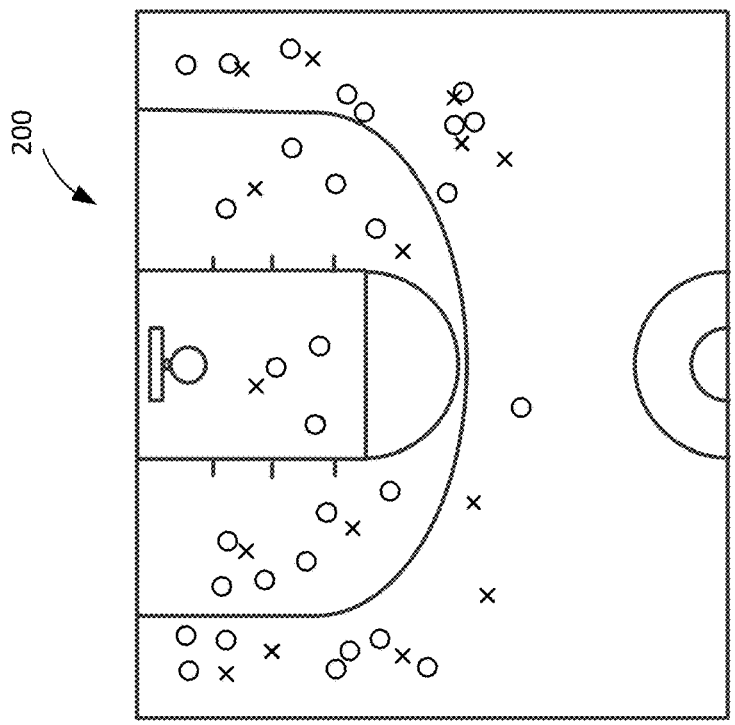

FIGS. 12 and 13 show shot location maps that may be displayed on display 210 to provide information on the shooter's location on the playing surface 119 when taking shots. FIG. 12 shows a shot location map 200 that indicates the shot placements for all the shots and whether the shot was made (indicated by a circle) or missed (indicated by an "X"). FIG. 13 shows a percentage map 250 for the same group of shots used in FIG. 12. However, instead of showing individual shot placements and corresponding shot statuses, FIG. 13 provides information on the percentage of shots made by the shooter 112 in a particular area of the playing surface 119. As shown in FIG. 13, each area of the playing surface 119 can include the percentage of shots made by the shooter 112 within that corresponding area. In other embodiments, the size of the areas can be adjusted such that more areas or a fewer areas are included in the percentage map 250. In one embodiment, the areas of the percentage map 250 can be provided with a color from a range of colors to visually indicate the percentage in an area relative to the percentages in other areas. In another embodiment, the shot placement map 200 can show areas with more shot placements and fewer shot placements, similar to placement maps 700 and 900. In still another embodiment, the information in placement maps 600, 700, 800 and 900 can be provided with the shot location map 200 and/or the percentage map 250 to provide the shooter 112 with additional information on shooting performance. For example, in response to the selection of an area in shot location map 200 and/or the percentage map 250, the system 100 can generate and provide the shooter with a placement map 600 and 700 for the shots taken in the selected area. Depending on the size of the selected area, a "normalized" base point can be created that corresponds to the mean of the base points for the group of shot placements in the selected area.

The shooting performance system 100 can also provide analytical information relating to shooting parameters used to evaluate whether the shooter 112 is a "good shooter." In one embodiment, the shooting parameters for evaluating a "good shooter" can include average entry angle, entry angle consistency, average depth in the hoop (i.e., average depth position), depth consistency, average left/right position (i.e., average lateral position) and left/right consistency. In other embodiments, shooting parameters such as entry angle range, median entry angle, depth range, median depth position, left/right range, median left/right position, ball velocity or other suitable shooting parameters can be used by the system 100 in place of or in addition to the previously identified shooting parameters when evaluating shooting performance.

The shooting performance system 100 can use the shot trajectory and shot placement data used in generating the shot placement maps to determine average entry angle, entry angle consistency, average depth position, depth consistency, average left/right position, left/right consistency, and/or other parameters. In one embodiment, the shooting performance system 100 can determine a "good shooter" by calculating corresponding "make zones" based on one or more of the averaged parameters and then comparing one or more of the remaining averaged parameters to determine if those parameters would result in shots in the calculated "make zone." For example, as noted herein, the "make zone" for a shooter having a more optimal angle of entry is generally larger than a "make zone" for a shooter having a less optimal angle of entry. In some embodiments, the system 100 can determine a desired "make zone" for a shooter based on his/her average entry angle and then compare the average depth position and average lateral position for the shooter to determine if those parameters are within the calculated "make zone." If so, the shooter may be characterized as a "good" shooter or a shooter with a higher shooting percentage. In some embodiments, the system 100 can determine a shooting percentage (or other shooting parameter) of a shooter based on the extent to which the shooter's average lateral position or depth is within his or her "make zone." For example, for the shooter's average lateral position or depth is within his or her "make zone," then the shooter may be characterized as a better shooter or be associated with a higher percentage the further the average lateral position or depth is from the boundary of his "make zone." That is, the shooter is characterized as a better shooter the better that his average shot position (e.g., lateral position or depth) is within his/her "make zone." In other embodiments, other techniques for determining shooting performance are possible.

The shooting performance system 100 can also use the consistency parameters in evaluating a "good shooter." In one embodiment, the consistency parameters can provide an indication of how frequently the shooter 112 has shots that are equal to or within a range of the corresponding average parameters. For example, the depth consistency for a shooter 112 having an average depth of 8 inches can be determined by calculating the percentage of shots from the shooter 112 that had a depth of 8 inches plus or minus a predetermined range (e.g., 1 inch) from the average value. In another embodiment, the consistency parameters can provide an indication of how frequently the shots of the shooter 112 are repeated at the same measurement. For example, the entry angle consistency for a shooter 112 can be determined by identifying the entry angle (e.g., 43 degrees) that most frequently occurs in the shots from the shooter 112 (which may or may not correspond to the average entry angle) and then determining the percentage of shots that occurred at the most frequent entry angle.

When evaluating shooting performance, the system 100 can use the consistency parameters as an independent factor or as a weighting factor. The system 100 may evaluate a shooter 112 as a "good shooter," if the shots from the shooter 112 have higher consistency percentages. The ability of a shooter 112 to frequently repeat a shot parameter can be indicative of someone who is a "good shooter" or someone who can be become a "good shooter" with additional instruction if the particular parameter that is frequently repeated is not within a desired range.

The shooting performance system 100 can provide segmented information on the shooting parameters or other shooting information, e.g., placement maps, as requested, for an individual or for some or all of the members of a team. The system 100 can segment the shooting parameter information for the shooter 112 into categories such as: defended shots; open shots; made shots; missed shots; close shots; far shots; shots off a right pass, left pass, inside pass, right dribble, left dribble, straight ahead dribble, step back dribble with right-hand, step back dribble with left-hand, crossover dribble right to left, crossover dribble left to right; shots from a particular area of the court; shots at a particular basket; shots against a particular team; shots against a particular defender; shots at a particular venue; and any other suitable segment that could provide beneficial information. In addition, the shooting performance system 100 can provide time-based information on the shooting parameters or other shooting information, e.g., placement maps, as requested. The system 100 can categorize the shooting parameter information for the shooter 112 into categories such as: shots in a particular period; shots after a particular amount of rest, shots during the pre-season; shots during the regular season; shots during the post-season; and any other suitable category that could provide beneficial information. As an example, the system 100 may indicate a player's shooting percentage (or other shooting parameter) from one or more areas on the playing surface for a particular half, game, or set of games.

The shooting performance system 100 can also provide comparison information with respect to the segmented and categorized shooting parameter information. For example, the system 100 can provide a comparison of shooting parameter information for a shooter 112 based on shots from the shooter 112 occurring after 1 day of rest, 2 days of rest, 3 days of rest, etc. Thus, the information can be analyzed to determine or estimate the extent to which rest prior to a game or other performance impacts the shooting performance of the player. The system 100 can also provide a comparison of shooting parameter information during the pre-season, the regular season and the post-season. The system 100 can provide a comparison of shooting parameter information for a shooter 112 based on shots from the shooter 112 occurring before an injury and after an injury. The system 100 can also provide a comparison of shooting parameter information based on shots from the shooter 112 occurring during different stages of the injury recovery process (e.g., at beginning of "rehab" and near end of "rehab").

If shooting information has been obtained for more than one shooter 112 or more than one team, comparison data can be provided between the shooter 112 (or team) and another shooter 112 (or team) or group of shooters 112 (or group of teams) to determine if the comparison data for the shooter 112 (or team) applies only to that shooter 112 (or team) or if the comparison data indicates a trend or tendency that would apply to most shooters 112 (or teams). The system 100 can determine that some shooting parameter comparisons are applicable to a broad group of shooters 112, while other shooting parameter comparisons are specific to an individual shooter 112. If there are some shooting parameter comparisons that are unique to the shooter 112, the information can be used to attempt to maximize team wins by either emphasizing or avoiding situations where the shooter's performance is different from most shooters and/or implementing training regimens to assist the shooter 112 in improving the areas that are not on the same level as most shooters 112. As an example, if a player's shooting performance decreases more than average over the course of the game, then it may be determined that fatigue has greater effect on this player than average. In such case, a coach may decide to utilize the player less in the second half or perform certain shooting drills at the end of practice to help the player to learn to shoot better when fatigued.

Figure 14:
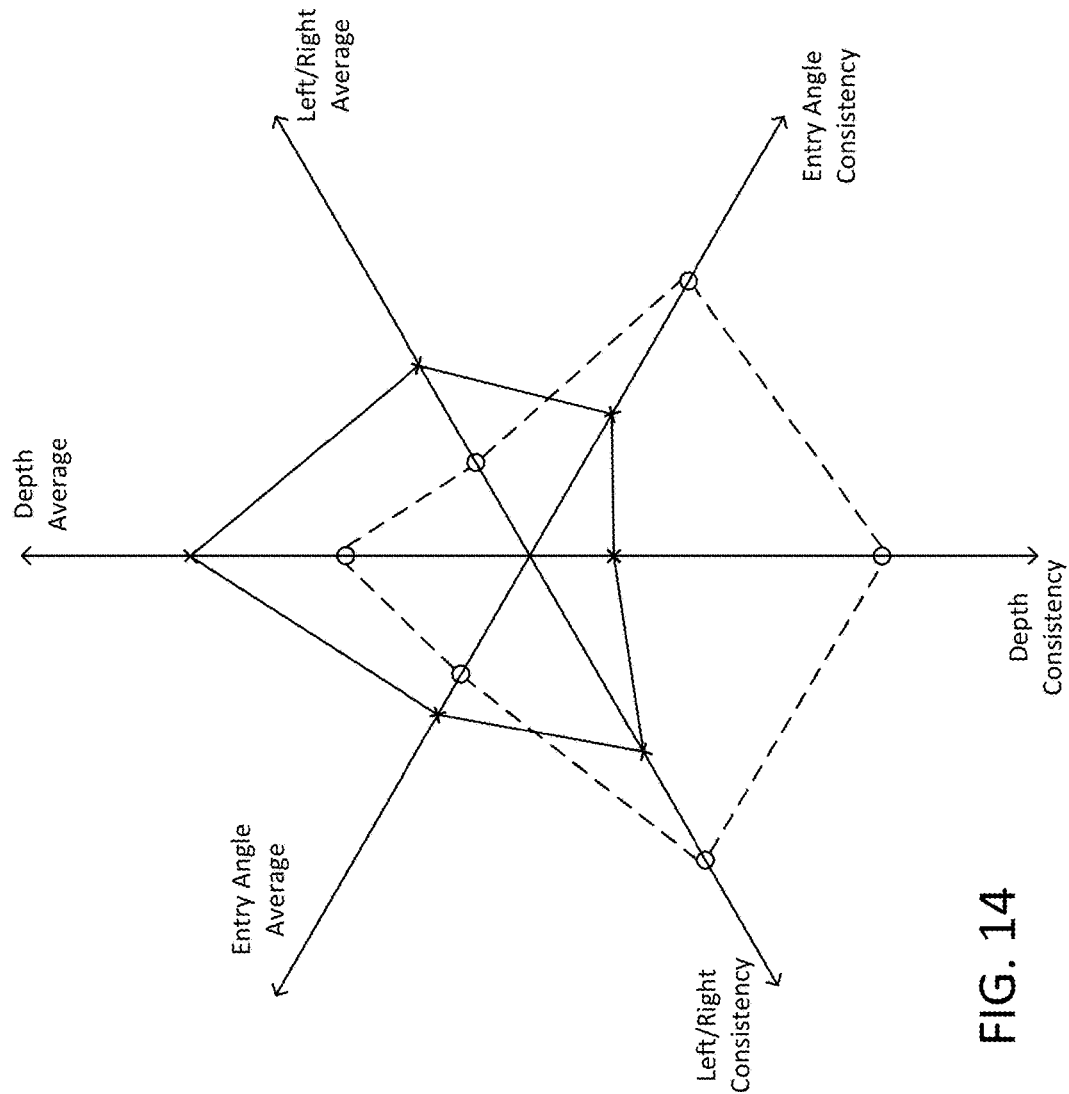
FIG. 14 shows an embodiment of spider graph for the shooting parameters of a shooter.

FIG. 14 shows a spider chart that may be displayed on display 210 to provide information on the shooter's performance with respect to the shooting parameters used to evaluate a "good shooter." FIG. 14 shows a spider chart, radar chart or web chart of average entry angle, entry angle consistency, average depth position, depth consistency, average left/right position and left/right consistency for the made shots (indicated by a circle) and the missed shots (indicated by an "X") for the shooter. In other embodiments, other types or combinations of shooting parameters may be used for the chart depicted by FIG. 14, and different types may be employed as may be desired.

In the example shown in FIG. 14, the shooter 112 has higher consistency parameters for the made shots and lower consistency parameters for the missed shots. The higher consistency parameters for the made shots can be an indicator that the shooter 112 was able to place the ball within the "make zone" and the result was a made shot. In contrast, the shooter 112 has "higher" average entry angle, average depth position and average left/right position for the made shots and "lower" average entry angle, average depth position and average left/right position for the missed shots. The higher average entry angle, average depth position and average left/right position parameters for the made shots can be an indicator that the shooter 112 was not able to place the ball within the "make zone" and the result was a missed shot.

In an embodiment, the shooting performance system 100 can evaluate the shooting parameters used to evaluate a "good shooter" to determine if there are any relationships among the shooting parameters or if the shooting parameters are independent. The shooting performance system 100 can evaluate the shooting parameters for an individual shooter 112 or of a group of shooters 112 when attempting to determine relationships among the shooting parameters. The shooting performance system 100 may be able to establish relationships among entry angle and left/right position or depth position. For example, the system 100 may identify a relationship between entry angle and depth position such that a lower entry angle results in a greater depth position and a higher entry angle results in a lesser depth position. Similarly, the shooting performance system 100 may be able to establish relationships among entry angle consistency and left/right consistency or depth consistency. For example, the shooting performance system 100 may determine that a low entry angle can provide for better left/right position or that a low left/right consistency may have a better entry angle consistency. In some embodiments, the system 100 may analyze the shooting parameters and provide recommend ideal or target ranges for a particular player based on his/her personal performance history. As an example, the system 100 may determine a specific range for entry angle or other shooting parameter that is associated with a higher shooting percentage than for shots having the shooting parameter outside of the range. Thus, the ideal or target range for the same shooting parameter may be different for one shooter relative to another.

The shooting performance system 100 can be used to assist in evaluating or predicting the shooting capabilities of a shooter 112. The system 100 can provide information to coaches, players or other personnel indicating whether a person has the capability to develop into a "good shooter" with proper training. For example, a shooter 112 with higher numbers for entry angle consistency, depth consistency and/or left/right consistency may be determined to have a higher shooting capability than a shooter with lower consistency numbers because the shooter 112 with the higher consistency numbers has demonstrated an ability to repeat a shooting parameter, which ability can be translated into a capability to repeat a "good shot" with the proper training.

In contrast, the shooter 112 with lower consistency number may be identified as having a lower hand-eye coordination level, which may limit the capability of the person to become a "good shooter." However, even if the person only has a limited capability to be a "good shooter," the system 100 can still assist the person in improving his/her shooting via exercises that improve average entry angle, average depth position, and/or average left/right position. Coaches and other personnel can use the shooting capability information for a person in making determinations on which players to include on the team and/or which positions are best for a particular player.

Note that the capability of the shooter may be quantified using a value (e.g., a score) that is calculated or otherwise determined based on the assessed capability of the shooter. As an example, the value may be calculated using an algorithm based on any of several factors (e.g., the shooter's entry angle consistency, average entry angle, lateral position consistency, average lateral position, etc.). As a further example, the value may be calculated to be higher for players that are assessed to be better shooters such that a higher value indicates better shooting capability. In general, a capability value represents an estimation of a shooter's maximum shooting skill that can be achieved with training and practice. As an example, the system 100 may predict a likely maximum value or ceiling for any specific shooting parameter, such as the shooter's shooting percentage from a certain distance or location from the goal, the shooter's maximum entry angle consistency, or any other parameter described herein. The system 100 may also predict the player's future skill level or a certain shooting parameter at a certain time in the future based on how much improvement the player has demonstrated over time and the amount of training expected in the future according to a defined training regimen or based on past training patterns demonstrated by the player.

Also, note that a capability value or assessment may be based on the rate, referred to herein as "training rate," at which a player improves one or more shooting parameters or skill level. As an example, the system 100 may track the number shots attempted by a particular shooter and assess how much a particular parameter, such as average entry angle, shooting percentage, or any other parameter described herein, improves relative to a desired range for the shooting parameter. The system 100 may then compare this improvement to the number of shots taken during assessment of the training rate. As a mere example, the system 100 may calculate a value indicating how much the shooter's entry angle has improved (e.g., calculate the percentage improvement of the player's average entry angle) and divide such value by the number of shots taken to realize such improvement in order to provide a value indicating the per-shot rate at which the player is able to improve his/her average entry angle. Such a training rate value may be indicative of the player's eye/hand coordination or the player's ability to improve with training. Note that the rate does not have to be per shot. As an example, it should be per unit of time (e.g., per day), per practice session, or some other factor. Using a training rate value, the system 100 may calculate a capability value or otherwise assess the player's capability for improvement. As an example, the system 100 may predict a maximum shooting parameter (e.g., shooting percentage) or otherwise assess a maximum skill level for the player based on at least one training rate value and possibly other parameters, such as one or more of the player's current shooting parameters.

In some embodiments, the system 100 may use data from other players to predict how a given player will improve over time with training. As an example, the system 100 may determine a player's current shooting skill level and assess a training rate indicating the rate at which the player is currently improving one or more shooting parameters. The system 100 may then analyze the tracked performance of other player having similar shooting characteristics (e.g., at a similar skill level and similar training rate) to predict how much the shooting parameter or skill level of the player will likely change over time in order to provide a prediction of what the player's shooting parameter or skill level will be a certain point (e.g., time) in the future. As an example, the system 100 may calculate an average change (e.g., per shot or per unit of time) to the shooting parameter or skill level for the other players determined to have similar shooting characteristics relative to the current player, and then calculate the current player's future shooting parameter or skill level assuming that the player will progress according to the average. Note that the system 100 may provide a prediction of what the player's shooting parameter or skill level will be on a certain day or other time (e.g., month) in the future. In another example, the system 100 may predict what the player's shooting parameter or skill level will be after taking a particular number of shots (e.g., 10,000 or some other number) or after training for a certain number of hours in the future. In other embodiments, other techniques for assessing the shooter's capability and predicting future shooting characteristics of the shooter are possible. Note that the techniques described herein for assessing and predicting shooting performance may be similarly used to assess and predict other types of player performance, such as dribbling performance, passing performance, defensive guarding performance, etc.

In another embodiment, the shooting performance system 100 can also determine a release efficiency parameter for a shooter 112 based on the release height, the release separation and/or the release speed of the shots of the shooter 112. To calculate the release efficiency parameter for a shooter 112, the shooting performance system 100 may determine the release height, release separation, release speed parameters, and/or other release parameters and compare any of the these parameters to predefined criteria. By standardizing the determination of the release height, release separation and/or release speed (and ultimately the release efficiency parameter), the system 100 can compare different shot techniques across shooters 112 and shot types.

In one embodiment, the release height may be determined as the height of the ball in inches as it last touches the fingertips of the shooter 112. In some embodiments, the release height may be divided by a predetermined number (e.g., 200) or otherwise manipulated to help make the information more intuitive or easier to understand for a user. The release separation may be determined as the distance between the ball and the closest body part of the defender at the time that the ball last touches the finger tips. In some embodiments, the release separation may be divided by a predetermined number (e.g., 100) or otherwise manipulated to help make the information more intuitive or easier to understand for a user. The release speed may be determined as the time from when the ball reaches a predetermined height (e.g., the chin height of the shooter 112) to when the ball last touches the fingertips. In some embodiments, the release speed may be divided by a predetermined time period (e.g., 2/10 of a second) or otherwise manipulated to help make the information more intuitive or easier to understand for a user. Other techniques for determining the release height, release separation and/or release speed may be used in other embodiments.

The shooting performance system 100 can determine the release efficiency parameter by combining the release height, release separation, release speed, and/or other release parameters. The release height, release separation, release speed, and/or other release parameters may be added and/or multiplied to obtain the release efficiency parameter. In addition, one or more of the release height, release separation, release speed, and/or other release parameters may be weighted in calculating the release efficiency parameter. Other techniques and/or other parameters may be used in other embodiments to determine the release efficiency parameter.

The system 100 can provide the release efficiency information to coaches, players or other personnel indicating whether a person has the capability to improve as with proper training. For example, a shooter 112 with higher numbers for release speed may be determined to have a higher shooting capability than a shooter with lower numbers for release speed because the shooter 112 with the higher release speed has a lower probability of having a shot blocked by a defender, which can translate into an ability to take and make shots under a broader set of conditions. Coaches and other personnel can use the release efficiency information for a person in making determinations on which players to include on the team and/or how to best utilize a particular player.

In an embodiment, the shooting performance system 100 can also determine a guaranteed make ratio for a shooter 112. A "guaranteed make" for each shot attempt can correspond to the ball passing through the "make zone." The size of the "make zone" can change depending on the entry angle of the shot and other shooting parameters. The system 100 can calculate whether the shot went through the "make zone" using the entry angle and shot placement information collected for each shot. The system 100 can then determine the guaranteed make ratio by dividing the number of shots passing through the "make zone" by the total number of shots taken. The guaranteed make ratio for a shooter 112 can provide a better indicator of shooting capability than a percentage of shots successfully made by the shooter 112 since the percentage of shots successfully made may be inflated from shots that went through the hoop 103 but were not in the "make zone" and may not pass through the hoop 103 in subsequent similar attempts. In other words, the percentage of shots actually made may include a group of shots where the result is not repeatable by the shooter 112 or the type of shot is not desired for maximizing shooting percentage.

In one embodiment, the system 100 can provide feedback to the shooter 112 after each shot is taken by the shooter 112. The feedback information may be provided to the shooter 112 in one of a visual format, an audio format and a kinetic format. For instance, in one embodiment, on a visual display, the shot placement relative to the basketball hoop may be viewed by the shooter 112 or the lateral position and depth position of the shot may be viewed in a numeric format by the shooter 112. In another embodiment, when projected through an audio device, numeric values for the lateral position and depth position may be heard by the shooter 112. In yet another embodiment, a kinetic device, such as a bracelet or headband worn by the players may be used to transmit the feedback information in a kinetic format. For instance, the bracelet may vibrate more or less depending on how close the shot is to the center line 402 and/or a predetermined depth line (e.g., a line 11 inches from the base point 410). Alternatively, the bracelet may get hotter or colder depending on how close the shot is to the center line 402 and/or the predetermined depth line. Multiple feedback output mechanisms may also be employed. For instance, the feedback information may be viewed in a visual format by coaches or other spectators on a display while a sound projection device may be used to transmit the feedback information in an audio format to the players.

In general, the parameters may be presented qualitatively or quantitatively. An example of qualitative feedback may be a message such as "to the right" or "to the left" in reference to the lateral position of the shot by the player or "too front" or "too back" in reference to the depth position. An example of quantitative feedback may be the actual lateral position and/or depth position of the shot in an appropriate unit of measurement, such as a message of "2 inches to the right" for the lateral position or "8 inches deep" for the depth position. Again, the qualitative and/or quantitative information may be presented in different formats, such as a visual format, an auditory format, a kinetic format and combinations thereof.

With knowledge of the lateral position and depth position transmitted in the feedback information, the shooter 112 may adjust his next shot to generate a more optimal shot placement. For instance, if the feedback information is a lateral position and their shot is to the right, then the shooter 112 may adjust their next shot to move the shot to the left. The system 100 can then use the shot placement information for the subsequent shot (or group of shots) to determine if the shooter 112 overcompensates or undercompensates with respect to shot placement.

The feedback information may be provided to the player before the ball 109 reaches the hoop 103 or shortly after the ball 109 reaches the hoop 103. The system 100 is designed to minimize any waiting time between shots. For each shooter 112 and for different training exercises, there may be an optimal time between when the shooter 112 shoots the ball 109 and when the shooter 112 receives the feedback information. The system 100 may be designed to allow a variable delay time between the shot and the feedback information to suit the preferences of each shooter 112 that uses the system 100 or to account for different training exercises that may be performed with the system 100. For instance, a rapid shooting drill may require a faster feedback time than a more relaxed drill, such as a player shooting free throws.

In another embodiment, the system 100 can construct specific training exercises for each individual based on one or more of the shooting parameters to increase the learning rate and the shooting percentage for the individual. As an example, if a particular shooting parameter is low (e.g., below a predefined threshold), the system 100 could recommend a certain shooting drill or set of shooting drills associated with the shooting parameter and designed to improve such shooting parameter. In such embodiment, for each shooting parameter, the system 100 may store a list of drills or a practice regimen for improving such shooting parameter, and the system 100 may access and report such drills or regimen when the associated shooting parameter is within a certain range. Since the shooting parameters in need of improvement would be different for each individual, the training exercises and regimen would be highly individualized for each shooter 112. The shooting parameter information from the system 100 could also assist a coach to decide which players might best be able to improve their shot versatility for the benefit of the team and/or which training exercises would be most beneficial to a majority of players on the team. The information on the shooting parameters of a shooter 112 along with the recommended training regimen from the system 100 can assist a coach in predicting how long a particular training regimen would take to get the shooter to the next level of capability and what the ceiling capability would be for the shooter 112.

In another embodiment, the shooting performance system 100 can be expanded into a player performance system that can track the performance of both offensive and defensive players and provide a comprehensive training and feedback system to improve offensive and defensive player performance. The system 100 can determine one or more defensive parameters that indicate a defensive understanding of the game and one or more offensive parameters (in addition to shooting parameters) the indicate an offensive understanding of the game.

The analysis software 208 can determine the proficiency of a defender with respect to many different defensive parameters characteristics that provide an indication of a defensive understanding of the game. For example, some of the defensive parameters of the defender that can be evaluated by the analysis software 208 can include block parameters, rebound parameters, and/or steals. In an embodiment, block parameters can include one or more of block opportunities (i.e., shots that could be blocked by the defender), block attempts (i.e., shots that the defender tried to block), blocked shots, height of the block (i.e., how high was defender when blocking a shot), speed of the block (i.e., how fast did the ball travel after the block), lateral distance of the block (i.e., how far did the ball travel after the block), whether the block resulted in a change of possession (i.e., did the defensive team gain possession of the ball 109 after the block or did the offensive team keep possession of the ball 109), location of the block (i.e., whether the block occurred in an area near the hoop), and whether the block was illegal (e.g., a goal tend) or a foul was called on the defensive player. In an embodiment, the rebounding parameters can include one or more of contested rebounds obtained, tipped rebounds obtained, rebounds obtained against specific offensive players, separation (including body part separation) from the offensive player at time of the rebound, rebound height (i.e., how high did the ball travel above the hoop), rebound speed (i.e., how fast did the ball travel from the hoop), rebound lateral movement (i.e., how far did the ball travel from the hoop), and/or position of the body or parts of the body of the defender, (e.g., blocking out) prior to attempting to obtain the rebound. Using any such factors or other factors described herein, the system 100 may calculate a parameter indicative of the defender's proficiency as a defensive player, similar to the techniques described above for assessing the shooting proficiency of a shooter.

The analysis software 208 of the system 100 can also track which offensive players were guarded by the defender and how long the defender guarded each offensive player. The analysis software 208 can also track (for each offensive player) the separation of the defender and the offensive player (including body part separation) during each of dribbling moves, passing moves and shooting moves by the offensive player. The analysis software 208 can also determine the location of the defender and the offensive player on the playing surface 119 during each of the offensive moves. The analysis software 208 can provide corresponding categorized information regarding the defender's performance based on the defender's location on the floor, e.g., close to the hoop, near the 3-point line, on the left-side of the court or on the right-side of the court. The analysis software 208 can also track the offensive performance (e.g., shot versatility) for each of the offensive players guarded by the defender for use in evaluating the defensive performance of the defender.

In another embodiment, the analysis software 208 can determine one or more defensive movements based on a group of corresponding parameters that are determined by the analysis software 208. Each defensive movement, e.g., a "low lunge forward to steal the ball with two hands," can be defined as sequence or group of defensive characteristics that can include hand, arm, shoulder, and leg motions of various heights, of various speeds, of various directions, of various orientations, of various accelerations or decelerations, with various rotations and/or with various velocities. The analysis software 208 can determine the particular defensive characteristics associated with a particular defensive movement using the computer vision logic and then identify the type of defensive movement from the defensive characteristics. Other techniques for detecting defensive movements can be used in other embodiments.

The analysis software 208 can determine the proficiency of the shooter 112 (or other offensive player) with respect to many different offensive parameter characteristics that provide an indication of an offensive understanding of the game. For example, some of the offensive parameters of the offensive player that can be evaluated by the analysis software 208 can include types of shots taken (e.g., pull-up shots, close shots, catch and shoot shots or driving shots), shot versatility factor based on the types of shots taken (a player with a greater shot versatility factor is harder to guard and adds offensive benefit to the team), types of shots made (e.g., pull-up shots, close shots, catch and shoot shots or driving shots), made shot versatility factor based on the types of shots made, shooting parameters for both made shots and missed shots, rebounding parameters and/or turnover parameters. In an embodiment, the shooting parameter information can include the entry angle of the shot, shot placement, shot location, release speed of the shot, separation from the defender at time of shot release, release height of the shot, position of body or parts of the body of the shooter 112 when taking a shot (e.g., position of the shooter's feet when shooting at hoop 103), and the defender of the shooter 112. In an embodiment, the rebounding parameters can include contested rebounds obtained, tipped rebounds obtained, rebounds obtained against specific defenders, separation (including body part separation) from the defender at time of the rebound, rebound height (i.e., how high did the ball travel above the hoop), rebound speed (i.e., how fast did the ball travel from the hoop), rebound lateral movement (i.e., how far did the ball travel from the hoop), and/or position of the body or parts of the body of the offensive player, (e.g., blocking out) prior to attempting to obtain the rebound. In an embodiment, the turnover parameters can include turnovers occurring while dribbling (e.g., steals by the defender or ball or offensive player going out-of-bounds), turnovers occurring while passing (e.g., steals by the defender or ball going out-of-bounds), whether a rules violation occurred (e.g., a travelling violation) or a foul was called on the offensive player, and/or the position (including body part position) of the defender at the time of the turnover.

The analysis software 208 of the system 100 can also track which defensive players guarded the shooter 112 (or offensive player) and how long each defender guarded the offensive player. The analysis software 208 can also track (for each defensive player) the separation of the defender from the offensive player (including body part separation) during each of dribbling moves, passing moves and shooting moves by the offensive player. The analysis software 208 can also determine the location of the defender and the offensive player on the playing surface 119 during each of the moves. The analysis software 208 can provide corresponding categorized information regarding the offensive player's performance based on the offensive player's location on the floor. The analysis software 208 can also track the defensive performance (e.g., blocks and steals) for each of the defenders guarding the offensive player for use in evaluating the offensive performance of the shooter 112.

In another embodiment, the analysis software 208 can determine one or more offensive movements based on a group of corresponding parameters that are determined by the analysis software 208. Each offensive movement, e.g., a "dribble to the basket with the left hand," can be defined as sequence or group of offensive characteristics that can include hand, arm, shoulder, and leg motions of various heights, of various speeds, of various directions, of various orientations, of various accelerations or decelerations, with various rotations and/or with various velocities. The analysis software 208 can determine the particular offensive characteristics associated with a particular offensive movement using the computer vision logic and then identify the type of offensive movement from the offensive characteristics. Other techniques for detecting offensive movements can be used in other embodiments.

In one embodiment, the analysis software 208 can use the computer vision logic to identify the location in a 3-D space of the offensive and defensive player's fingers, hands, elbows, shoulders, chest, head, waist, back, thighs, knees, calves, hips, ankles, feet, and/or other body parts. In addition, once the individual body parts have been identified, the analysis software 208 can determine relative locations of the identified body parts to each other. The analysis software 208 can use the information regarding the location of the player's body for either offensive or defensive performance evaluations. As an example, based on the relative movement of the body parts, the software 208 may identify certain offensive or defensive moves effectuated by the player, such as a jump shot, a pick, a dribble, a hook shot, a layup, etc. In another embodiment, since the players on the playing surface 119 alternate between offense and defense, the analysis software 208 can specifically identify each of the players and store corresponding offensive and defensive information for each of the players.

In one embodiment, the analysis software 208 can be used to identify each of the players and provide each player's offensive and defensive metrics in real time. The analysis software 208 can also provide information on how each player is used on offense (e.g., shooter) and defense (e.g., rim protector). The analysis software 208 can also track and categorize the times during the game the player is on the court (e.g., beginning of game or quarter, end of game or quarter, or ahead or behind by a predetermined number of points) and provide corresponding offensive and defensive metrics for the player. The analysis software 208 can also track the amount of time the player is on the court and provide corresponding offensive and defensive metrics (e.g., shot attempts, made shots, missed shots, turnovers, fouls, or blocks per minute) based on the amount of playing time.

In an embodiment, the system 100 can use the offensive and defensive metrics for the players to provide recommendations on which offensive players should be taking shots in a game (and against which defensive players) and which defensive players should be guarding which offensive players. As an example, the system 100 may display a player's shooting percentage (or other shooting parameter) against each defender (i.e., the defender to be guarding the player for the set of shots defining the shooting percentage). To guard a particular shooter, the coach may select the player against which the shooter has the lowest shooting percentage for the game, the half, the season, or some other time period. In addition, the system 100 can provide recommendations on times during a game when a specific offensive player should be taking shots or when a particular defensive player should be used to guard offensive players. For example, the system 100 can identify that a particular offensive player has good shooting performance at the beginning of halves (or other periods), but has lower shooting performance at the end of halves (or other periods) and then recommend that the player be play more (in terms of time) at the beginning of a half and less at the end of the half. The system 100 can provide recommendations on particular areas of the floor where the offensive or defensive player should be located. For example, the system 100 can identify that a particular defensive player has good defensive metrics when guarding offensive players near the basket, but has lower defensive metrics when required to guard offensive players away from the basket and then recommend that the player be used to guard offensive players near the basket. The system 100 can provide recommendations on the types of shots an offensive player should be taking (e.g., catch and shoot shots) and on the types of shots a defensive player should be guarding (e.g., driving shots). In this regard, the system 100 may categorize a shooting parameter (such as shooting percentage) based on shot type such that a shooter can determine which types of shots he/she is likely to be more successful. Such feedback may be further categorized based on shot location. As an example, the feedback may indicate that a shooter has a higher shooting percentage for one type of shot near or the left of the basket and for a different type of shot further or to the right of the basket. By analyzing the feedback, the shooter can determine which types of shots are likely to be more successful in certain regions of the playing surface.

In an embodiment, the system 100 can be used to evaluate a player's ability to recover from an injury. As previously discussed, the system 100 can provide shooting performance information for a shooter 112 as he/she recovers from an injury. However, the system 100 can also provide comparison information on the offensive or defensive player recovering from an injury with respect to other players recovering from the same or similar injury (if the system 100 is collecting and storing information on multiple players). For example, the system 100 can identify if most players require a specific amount of recovery time for a particular injury or is the recovery time for an injury based on the individual player. The system 100 can also identify if particular injuries result in a similar performance decrease among players or if any changes in performance is based on the individual player.

As an example, the system 100 may track various players having the same injury and determine how long it takes one or more shooting parameters to return to within a certain margin of the player's pre-injury state. Such information may be useful for a coach is assessing how long it will take a player to recover from an injury. Also, if a shooting parameter of a player is not returning to such a state within the same average time period as other players, it may indicate that the player's injury is more severe than expected, that the player is not training hard enough to rehabilitate his/her injury. In an embodiment, the system 100 can use information on recovery times to identify types of training and drills that can be used to shorten the recovery time for a player. In this regard, the system 100 may receive information indicating the types of drills or rehabilitation regimens that various players are using to recover the same type of injury. By comparing the performance results, such as shooting parameters, during rehabilitation, the system 100 can assess which techniques are more effective in returning a player close to his/her pre-injury state. Using such information, the system 100 may make recommendations to other players suffering the same or similar injury. In any event, the system 100 may compare the shooting parameters of a player to a group of players who have suffered the same or similar injuries in order to provide useful information in evaluating the player's injury or training techniques or in making recommendations to the player for rehabilitating the injury.

Figure 15:
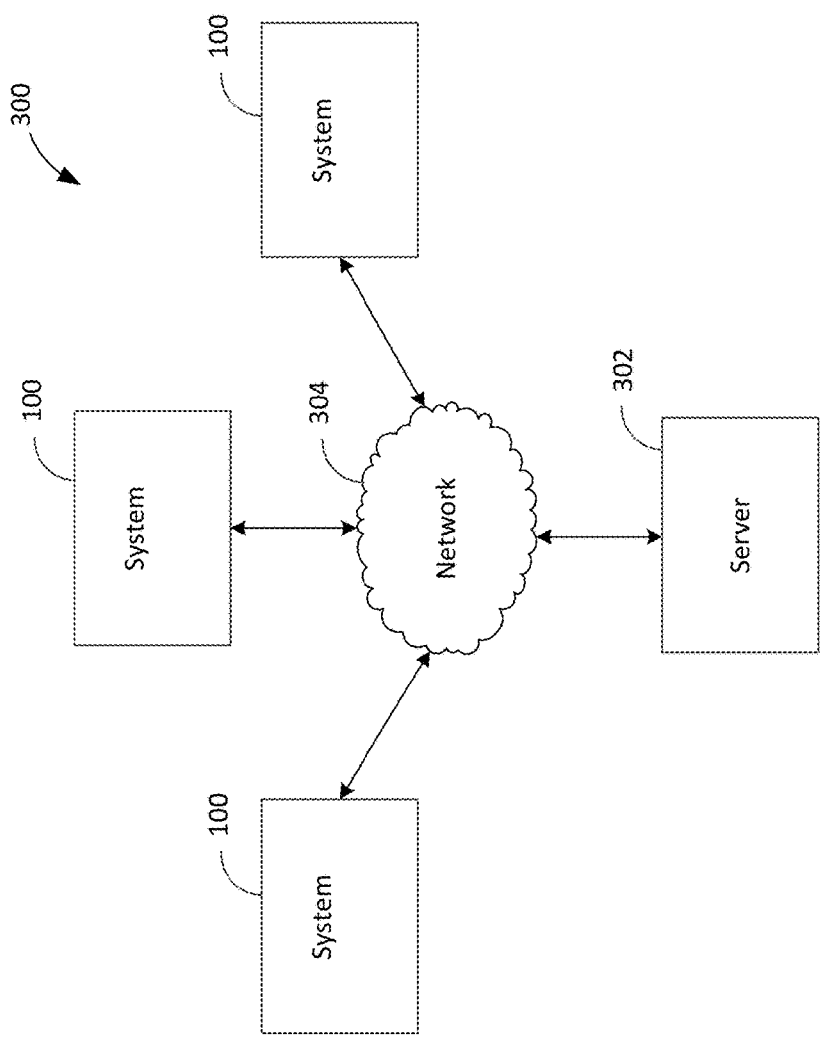
FIG. 15 shows an embodiment of a data aggregation system.

In an embodiment, the system 100 can be part of a larger data aggregation system that collects and processes player performance information from multiple systems 100. FIG. 15 shows an embodiment of a data aggregation system 300. The aggregation system 300 can include a server 302 that is connected to multiple systems 100 by a network 304. As each system 100 collects player performance information (e.g., shooting parameter information), the system 100 can provide the information to the server 302. In one embodiment, the systems 100 can automatically provide the player performance information to the server 302 on a predetermined time schedule (e.g., once a day) or when a predetermined amount of information has been collected (e.g., 5 gigabytes or 1000 records). In another embodiment, the server 302 can automatically request information from the systems 100 at predetermined times or in a predetermined sequence. In still another embodiment, an operator of a system 100 can manually initiate the providing (or uploading) of information to the server 302.

In one embodiment, the network 304 can be the Internet and use the transmission control protocol/Internet protocol (TCP/IP) to communicate over the network 304. However, in other embodiments, the network 304 may be an Intranet, a local area network (LAN), a wide area network (WAN), a Near Field Communication (NFC) Peer to Peer network, or any other type of communication network using one or more communication protocols.

Figure 16:
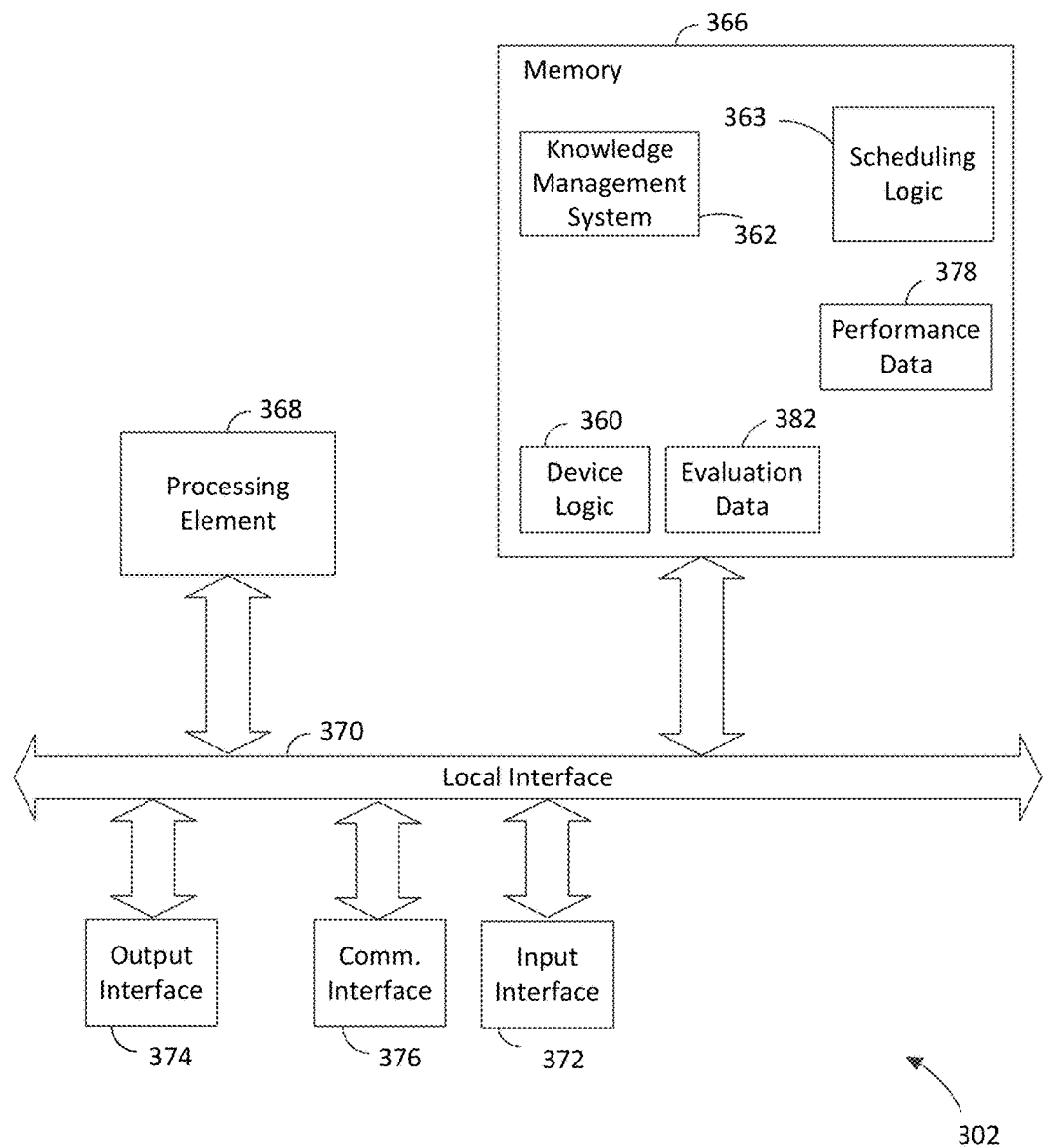
FIG. 16 is a block diagram of an embodiment of a server used in the data aggregation system of FIG. 15.

FIG. 16 shows an embodiment of the server 302. The server 302 may be implemented as one or more general or special-purpose computers, such as a laptop, hand-held (e.g., smartphone), user-wearable (e.g., "smart" glasses, "smart" watch), user-embedded, desktop, or mainframe computer. The server 302 can include logic 360, referred to herein as "device logic," for generally controlling the operation of the server 302, including communicating with the systems 100 of the data aggregation system 300. The server 302 also includes logic 362, referred to herein as a "knowledge management system," to review and process the information from the systems 100 and scheduling logic 363 to manage the reserving of systems 100 for use by individuals or teams. The device logic 360, the scheduling logic 363 and the knowledge management system 362 can be implemented in software, hardware, firmware or any combination thereof. In the server 302 shown in FIG. 16, the device logic 360, the scheduling logic 363 and the knowledge management system 362 are implemented in software and stored in memory 366 of the server 302. Note that the device logic 360, the scheduling logic 363 and the knowledge management system 362, when implemented in software, can be stored and transported on any non-transitory computer-readable medium for use by or in connection with an instruction execution apparatus that can fetch and execute instructions.

The server 302 can include at least one conventional processing element 368, which has processing hardware for executing instructions stored in memory 366. As an example, the processing element 368 may include a central processing unit (CPU), a digital signal processor (DSP), a graphic processing unit (GPU) and/or a quantum processing unit (QPU). The processing element 368 communicates to and drives the other elements within the server 302 via a local interface 370, which can include at least one bus. Furthermore, an input interface 372, for example, a keypad, keyboard, "smart" glasses, "smart" watch, microphone or a mouse, can be used to input data from a user of the server 302, and an output interface 374, for example, a printer, speaker, "smart" glasses, "smart" watch, "direct to brain" system, "direct to retina" system, monitor, liquid crystal display (LCD), or other display apparatus, can be used to output data to the user. Further, a communication interface 376 may be used to exchange data with the systems 100 via the network 304 as shown in FIG. 15.

The knowledge management system 362 can use the performance information obtained from one system 100 (including performance information for the gym/team(s)/individual(s)) and analyze the obtained performance information compared to the mass or aggregate of performance information gathered from all the systems 100 (including performance information for the gyms/teams/individuals). In one embodiment, the knowledge management system 362 can analyze the performance data 378 from the systems 100 to determine practice approaches and individual training approaches that are most effective at building winning teams or developing top athletes. For example, the knowledge management system 362 can compare practice and training approaches for very successful teams with those used by less successful teams to identify practice and training approaches that may be used to improve team performance. In another example, the knowledge management system 362 can compare shooting drills between highly accomplished shooters, moderately accomplished shooters and inexperienced or less accomplished shooters to identify shooting drills or practice/training approaches that may be used to develop a player's shooting ability. In addition, similar to the techniques described above for making training recommendations to rehabilitate injuries, the system 100 may track the training techniques used by players and assess the performance improvement that one or more techniques have on a particular shooting parameter to determine which training techniques (e.g., shooting parameters) have the greatest impact on that shooting parameter. When a particular shooting parameter is in a certain range (e.g., below a predefined threshold) or when a user provides an input indicating that a player would like to improve a certain shooting parameter, the system 100 may then recommend techniques that have historically had the greatest impact on such shooting parameter for other players. Similar techniques may be used for other types of performance parameters, such as dribbling parameters or defensive parameters, as may be desired.

In another embodiment, the knowledge management system 362 can analyze the performance data 378 from the systems 100 to determine practice approaches and individual training approaches that are most effective at correcting offensive or defensive parameter deficiencies. For example, the knowledge management system 362 can compare practice and training approaches used by shooters 112 having low entry angles to identify those practice and training approaches that resulted in an improvement in the shooter's entry angle. In another example, the knowledge management system 362 can compare practice and training approaches used by shooters having a common lateral position deficiency for particular shots (e.g., baseline shots to the left) to identify those practice and training approaches that resulted in an improvement in the shooter's lateral position for the particular shot.

The knowledge management system 362 can also analyze the performance data 378 from the system to determine practice approaches and individual training approaches that are most effective at developing a new skill for the player or improving the overall pace of development for the player. For example, the knowledge management system 362 can compare practice and training approaches used by players to develop a behind-the-back dribble technique to identify those practice and training approaches that resulted in the player being able to quickly and efficiently develop a behind-the-back dribble.

As shown by FIG. 16, evaluation data 382 and performance data 378 can be stored in memory 366 at the server 302. The performance data 378 can include the performance information on the gyms/teams/individuals acquired by each system 100 and provided to the server 302. In another embodiment, the performance data 378 can also include information on training exercises, programs and/or regimens that have been utilized with individual systems 100. For example, the performance data 378 can include information on programs used for skills training (e.g., shooting drills, rebounding drills, dribbling drills, defensive drills, blocking out drills, etc.), offensive set training (i.e., how to most effectively teach new plays), or conditioning training.

In an embodiment, the performance data 378 can be anonymized for privacy concerns by either the systems 100 before providing the information to the server 302 or by the server 302 on receipt of the information from the systems 100. The performance data 378 can be processed by the device logic 360 and/or the knowledge management system 362 to generate the evaluation data 382. In one embodiment, the knowledge management system 362 can generate evaluation data 382 by aggregating the performance data 378 from the systems 100 and analyzing the aggregated information to identify information that can be used to improve the performance of a player and/or team.

The evaluation data 382 can include data and information obtained from the knowledge management system 362 as a result of the processing and analyzing the performance data 378. The evaluation data 382 can include aggregated performance information associated with one or more offensive and/or defensive parameters and aggregated training information associated with one or more training/practice approaches used by teams and/or individuals. The aggregated information may be categorized based on individual players, teams, programs (e.g., a high school program including a varsity team, a junior varsity team, a freshman team, etc.), regions (e.g., one or more states, counties, cities, etc.), leagues/conferences, organizations (e.g., Amateur Athletic Union (AAU)), genetic characteristics (e.g., human genome) and any other suitable or desired categorization. The evaluation data 382 can also include training information, such as diagrams and videos, on "proper" offensive and/or defensive techniques that can be provided to systems 100 for use by individuals using the systems 100. The evaluation data 382 may include one or more testing procedures based on "proper" offensive and/or defensive technique form that can be used to evaluate the performance of a user.

The scheduling logic 363 can provide a scheduling portal for third parties to be able to reserve a facility (e.g., a gymnasium or sports field) with a corresponding system 100 for personal use. The user or administrator of a system 100 (or the system 100 itself) can provide information to server 302 (and the scheduling logic 363) as to the days/times when the facility is in use (or alternatively, when the facility is available). In one embodiment, the availability information for a facility can be included with the performance data provided by the system 100 to the server 302. However, in other embodiments, the system 100 can provide the availability information separate from the performance data.

The scheduling logic 363 can then use the availability information from the system 100 to determine the days/times when the facility may be available for use by third parties. Once the scheduling logic 363 has determined when a facility is available for use by third parties, a third party can then use the scheduling portal to determine the availability of the facility and reserve the facility for his/her use. The scheduling portal can also be used to collect any information (e.g., contact information, insurance information, intended use, etc.) and payments required by the facility to complete a reservation by a third party and before the facility may be used by the third party. Once the reservation has been completed, the scheduling logic 363 can push an update to the system 100 providing the time when the facility will be used by the third party, the required information from the third party to complete the reservation, and the payment information. In another embodiment, the scheduling logic 363 may also send a notification to a user or administrator of the system 100 informing them of the reservation by the third party.

The scheduling portal can be used by a third party to search for available facilities (if more than one facility has provided availability information) and available times for the facility. In addition, the scheduling portal may be able to provide the third party with an image(s) of the facility using the camera(s) 118 of the system 100 prior to the third party making a reservation. In one embodiment, the third party can decide to use the system 100 at the facility during the reserved time or to have the system 100 inactive when the third party is using the facility. In another embodiment, a facility without a system 100 can also provide availability information to server 302 for use by scheduling logic 363.

Information passed between the different components in the system may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IrDA, WiFi and HomeRF.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A system for evaluating basketball shooting performance, the system comprising:

at least one sensor configured to sense a basketball during a basketball shot at a basketball hoop by a player;

a memory device;

at least one processor configured to receive, from the at least one sensor, sensor data indicative of the basketball during the basketball shot, the at least one processor configured to select a base point for the basketball shot based on the sensor data, wherein a location of the selected base point relative to a predefined reference point is indicative of a first shot direction for the basketball shot, wherein the at least one processor is further configured to determine a shot placement of the basketball shot with respect to the basketball hoop based on the selected base point, wherein the at least one processor is configured to generate a map characterizing a shooting performance of the player, wherein the map indicates a plurality of shot placements for a plurality of basketball shots with respect to the basketball hoop, wherein the at least one processor is configured to normalize the shot placement to a predefined reference point by rotating the shot placement by an amount based on the selected base point, thereby defining a normalized shot placement for the basketball shot, such that the normalized shot placement is indicated on the map as if the basketball shot was taken from a predefined shot direction rather than the first shot direction; and an output interface configured to provide an output based on the generated map.

2. The system of claim 1, wherein the at least one processor is configured to determine a location of the player when taking the basketball shot and to select the base point for the basketball shot based on the location of the player.

3. The system of claim 2, wherein the at least one processor is configured to determine a trajectory for the basketball shot based on the sensor data and to determine the location of the player based on the determined trajectory.

4. The system of claim 2, wherein the at least one processor is configured to generate a location map indicating the location of the player when taking the basketball shot, the at least one processor configured to determine a shot status for the basketball shot, wherein the shot status corresponds to one of a made shot or a missed shot, the at least one processor configured to include the shot status on the generated location map.

5. The system of claim 1, wherein the shot placement includes a lateral position with respect to the basketball hoop and a depth position with respect to the basketball hoop.

6. The system of claim 5, wherein the lateral position is defined with respect to a first line associated with the basketball hoop and the depth position is defined with respect to a second line associated with the basketball hoop that is perpendicular to the first line.

7. The system of claim 6, wherein the first line of the basketball hoop passes through the base point and a center of the basketball hoop and the second line passes through one of the base point or the center of the basketball hoop.

8. The system of claim 1, wherein the at least one processor is configured to determine a shot status for the basketball shot, the shot status corresponding to one of a made shot or a missed shot, the at least one processor configured to include the shot status on the generated map.

9. The system of claim 1, wherein the memory device is configured to store a plurality of shot placements for a plurality of basketball shots, wherein the at least one processor is configured to determine at least one area associated with the basketball hoop having at least a portion of the plurality of shot placements in the at least one area, and wherein the at least one processor is configured to include the at least one area on the generated map.

10. A system for evaluating basketball shooting performance, the system comprising:

at least one sensor configured to sense a basketball during a basketball shot at a basketball hoop by a player;

a memory device configured to store a plurality of shot placements for a plurality of basketball shots with respect to the basketball hoop;

at least one processor configured to receive, from the at least one sensor, sensor data indicative of the basketball during the basketball shot, the at least one processor configured to select a base point for the basketball shot based on the sensor data, wherein a location of the selected base point relative to a predefined reference point is indicative of a first shot direction for the basketball shot, wherein the at least one processor is further configured to determine a shot placement of the basketball shot with respect to the basketball hoop based on the selected base point, wherein the at least one processor is configured to generate a map characterizing a shooting performance of the player, wherein the map indicates the plurality of shot placements, wherein the at least one processor is configured to normalize the shot placement to a predefined reference point based on the selected base point, thereby defining a normalized shot placement for the basketball shot, such that the normalized shot placement is indicated on the map as if the basketball shot was taken from a predefined shot direction rather than the first shot direction; and an output interface configured to provide an output based on the generated map, wherein the at least one processor is configured to determine at least one area associated with the basketball hoop having at least a portion of the plurality of shot placements in the at least one area, and wherein the at least one processor is configured to include the at least one area on the generated map, and wherein the determined at least one area includes a plurality of areas, each area of the plurality of areas being identified on the generated map based on a number of shot placements of the plurality of shot placements in the corresponding area.

11. The system of claim 1, wherein the at least one sensor comprises at least one camera and the sensor data includes a plurality of images from the at least one camera.

12. A system for evaluating basketball shooting performance, the system comprising:

at least one sensor configured to capture images of a player taking a plurality of basketball shots at a basketball hoop, the plurality of basketball shots being taken from different locations on a basketball court and from different shot directions relative to the basketball hoop;

at least one processor configured to receive image data defining the images from the at least one sensor, the at least one processor configured to identify the basketball within the images for each of the plurality of basketball shots and to select a respective base point for each of the plurality of basketball shots based on the images, wherein a location of each selected base point relative to a predefined reference point indicates a shot direction for a corresponding one of the plurality of basketball shots, wherein the at least one processor is configured to determine shot placements for the plurality of basketball shots with respect to the basketball hoop and to normalize the shot placements based on the base points such that each of the normalized shot placements is relative to a predefined shot direction as if each of the basketball shots was taken from the predefined shot direction, wherein the at least one processor is configured to generate a map based on the normalized shot placements, the map indicative of the normalized shot placements with respect to the basketball hoop, wherein the at least one processor is configured to determine at least one area associated with the basketball hoop having at least a portion of the shot placements in the at least one area, wherein the at least one processor is configured to include the at least one area on the generated map, and wherein the determined at least one area includes a plurality of areas, each area of the plurality of areas being identified on the generated map based on a number of the shot placements in the corresponding area; and an output interface configured to display the generated map.

13. The system of claim 12, wherein the displayed map includes a value indicative of a shooting performance of the player for the plurality of basketball shots.

14. The system of claim 12, wherein the at least one processor is configured to determine a respective trajectory for at least one of the plurality of basketball shots based on the images and determine the location of the player on the basketball court for the at least one of the plurality of basketball shots based on the trajectory, and wherein the at least one processor is configured to determine at least one of the base points based on the location of the player.

15. The system of claim 12, wherein each of the shot placements includes a lateral position defined with respect to the basketball hoop and a depth position defined with respect to the basketball hoop.

16. The system of claim 12, wherein the at least one processor is configured to determine a shot status for each of the plurality of basketball shots, the shot status corresponding to one of a made shot or a missed shot, and wherein the at least one processor is configured to include shot status for each of the shot placements on the generated map.

17. A system for evaluating basketball shooting performance, the system comprising:
at least one sensor configured to capture images of a player taking a plurality of basketball shots at a basketball hoop, the plurality of basketball shots being taken from different locations on a basketball court and from different shot directions relative to the basketball hoop;
at least one processor configured to receive image data defining the images from the at least one sensor, the at least one processor configured to identify the basketball within the images for each of the plurality of basketball shots and to select a respective base point for each of the plurality of basketball shots based on the images, wherein a location of each selected base point relative to a predefined reference point indicates a shot direction for a corresponding one of the plurality of basketball shots, wherein the at least one processor is configured to determine shot placements for the plurality of basketball shots and to normalize the shot placements based on the base points such that each of the normalized shot placements is relative to a predefined shot direction as if each of the basketball shots was taken from the predefined shot direction, wherein the at least one processor is configured to generate a map based on the normalized shot placements, the map indicative of the normalized shot placements with respect to the basketball hoop, and wherein the at least one processor is configured to normalize at least one of the shot placements by rotating the at least one shot placement by an amount based on a corresponding one of the base points; and an output interface configured to display the generated map.

18. A system for evaluating basketball shooting performance, the system comprising:
at least one sensor configured to sense at least one basketball during a plurality of shots of the at least one basketball at a basketball hoop by a player, the plurality of shots including at least a first shot of the at least one basketball at the basketball hoop and a second shot of the at least one basketball at the basketball hoop;
at least one processor configured to determine, based on the at least one sensor, a shot placement of the at least one basketball with respect to the hoop for the first shot and a shot placement of the at least one basketball with respect to the hoop for the second shot, the at least one processor further configured to correlate the shot placement of the first shot with first data indicative of a first shot direction for the first shot relative to the hoop and to correlate the shot placement of the second shot with second data indicative of a second shot direction for the second shot relative to the hoop, wherein the second shot direction is different than the first shot direction, wherein the first data defines a first base point having a location based on the first shot direction for the first shot, and wherein the second data defines a second base point having a location based on the second shot direction for the second shot, the at least one processor further configured to define a map of the hoop and to indicate shot placements with respect to the hoop on the map, wherein the at least one processor is configured to normalize the first shot placement and the second shot placement with respect to a predefined shot direction based on the first base point defined by the first data and based on the second base point defined by the the second data such that (1) the normalized first shot placement is indicated on the map relative to the predefined shot direction as if the first shot was taken from the predefined shot direction instead of the first shot direction and (2) the normalized second shot placement is indicated on the map relative to the predefined shot direction as if the second shot was taken from the predefined shot direction instead of the second shot direction; and an output interface configured to display the map,
wherein the at least one processor is configured to determine a first angle between the first base point and a predefined reference point associated with the predefined shot direction and to rotate the first shot placement based on the first angle.

19. The system of claim 18, wherein the at least one processor is configured to determine a second angle between the second base point and the predefined reference point associated with the predefined shot direction and to rotate the second shot placement based on the second angle.

20. A method for evaluating basketball shooting performance, comprising:
sensing at least one basketball with at least one sensor during a plurality of shots of the at least one basketball at a basketball hoop by a player, the plurality of shots including at least a first shot of the basketball at the basketball hoop and a second shot of the at least one basketball at the basketball hoop;

determining with at least one processor a shot placement of the at least one basketball with respect to the hoop for the first shot based on the sensing;

determining with the at least one processor a shot placement of the at least one basketball with respect to the hoop for the second shot based on the sensing;

determining a first shot direction for the first shot with the at least one processor based on the sensing;

determining a second shot direction for the second shot with the at least one processor based on the sensing, wherein the second shot direction is different than the first shot direction;

correlating the shot placement of the first shot with first data indicative of the first shot direction relative to the hoop;

correlating the shot placement of the second shot with second data indicative of the second shot direction relative to the hoop;

normalizing the first shot placement by rotating the first shot placement by an amount based on the first shot data, thereby defining a normalized first shot placement with respect to the hoop, such that the normalized first shot placement is relative to a predefined shot direction as if the first shot was taken from the predefined shot direction instead of the first shot direction;

normalizing the second shot placement by rotating the second shot placement by an amount based on the second shot data, thereby defining a normalized second shot placement with respect to the hoop, such that the normalized second shot placement is relative to the predefined shot direction as if the second shot was taken from the predefined shot direction instead of the second shot direction;

displaying a map of the hoop with an output interface;

indicating the normalized first shot placement on the map; and indicating the normalized second shot placement on the map.

21. The method of claim 20, further comprising:

selecting with the at least one processor a first base point for the first shot based on the first shot direction; and selecting with the at least one processor a second base point for the second shot based on the second shot direction, wherein the normalizing the first shot placement is based on the first base point, and wherein the normalizing the second shot placement is based on the second base point.

22. A method for evaluating basketball shooting performance, comprising:

sensing at least one basketball with at least one sensor during a plurality of shots of the at least one basketball at a basketball hoop by a player, the plurality of shots including at least a first shot of the basketball at the basketball hoop and a second shot of the at least one basketball at the basketball hoop;

determining with at least one processor a shot placement of the at least one basketball with respect to the hoop for the first shot based on the sensing;

determining with the at least one processor a shot placement of the at least one basketball with respect to the hoop for the second shot based on the sensing;

determining a first shot direction for the first shot with the at least one processor based on the sensing;

determining a second shot direction for the second shot with the at least one processor based on the sensing, wherein the second shot direction is different than the first shot direction;

correlating the shot placement of the first shot with first data indicative of the first shot direction relative to the hoop;

correlating the shot placement of the second shot with second data indicative of the second shot direction relative to the hoop;

normalizing the first shot placement based on the first shot data, thereby defining a normalized first shot placement with respect to the hoop, such that the normalized first shot placement is relative to a predefined shot direction as if the first shot was taken from the predefined shot direction instead of the first shot direction;

normalizing the second shot placement based on the second shot data, thereby defining a normalized second shot placement with respect to the hoop, such that the normalized second shot placement is relative to the predefined shot direction as if the second shot was taken from the predefined shot direction instead of the second shot direction;

storing in memory a plurality of shot placements for the plurality of shots;

determining with the at least one processor at least one area associated with the basketball hoop having at least a portion of the plurality of shot placements in the at least one area;

displaying a map of the hoop with an output interface, the map including the at least one area;

indicating the normalized first shot placement on the map; and indicating the normalized second shot placement on the map, wherein the determined at least one area includes a plurality of areas, each area of the plurality of areas identified on the generated map based on a number of shot placements of the plurality of shot placements in the corresponding area.

* * * * *